United States Patent [19]

Carney et al.

[11] Patent Number: 4,725,001
[45] Date of Patent: Feb. 16, 1988

[54] ELECTRONIC THERMOSTAT EMPLOYING ADAPTIVE CYCLING

[75] Inventors: Daniel C. Carney, Baltimore; Alec Bernstein, both of Baltimore, Md.; Arnold D. Berkeley, 10687 Weymouth St., Apt. 102, Bethesda, Md. 20814

[73] Assignee: Arnold D. Berkeley, Washington, D.C.

[21] Appl. No.: 920,291

[22] Filed: Oct. 17, 1986

[51] Int. Cl.⁴ .............................................. F23N 5/20
[52] U.S. Cl. ...................................... 236/11; 165/12; 236/46 R
[58] Field of Search ................. 62/231; 236/46 R, 94, 236/10, 11; 165/11 R, 12; 364/505, 557

[56] References Cited

U.S. PATENT DOCUMENTS

| | | | |
|---|---|---|---|
| 4,199,023 | 4/1980 | Phillips | 165/12 |
| 4,327,557 | 5/1982 | Clarke et al. | 62/234 X |
| 4,354,241 | 10/1982 | Barello | 364/492 |
| 4,356,962 | 11/1982 | Levine | 236/11 |
| 4,408,711 | 10/1983 | Levine | 236/11 |
| 4,460,123 | 7/1984 | Beverly | 236/46 R |

*Primary Examiner*—William E. Wayner
*Attorney, Agent, or Firm*—Epstein & Edell

[57] ABSTRACT

Environmental heating/cooling systems are controlled by an interactive microprocessor and have continuous on-time and adaptive cycling modes wherein continuous on-time brings the temperature to a programmed set point and cycling precisely maintains that temperature rather than causing the temperature to oscillate between limits of a dead zone. Minimum pause and on-time intervals of the cycling mode are established in accordance with optimum thermal transfer efficiency and/or equipment limitations. The initial cycle pause interval is a function of the degree transition time (i.e., time required for system to change temperature one degree as measured during continuous on-time mode); the initial cycle on-time interval becomes the established minimum interval. Cycle intervals are modified as necessary to maintain the temperature at the set point with preference given to minimizing the cycle on-time interval. Hence, the cycle on-time interval is decreased to its established minimum before attempting to increase the cycle pause interval; conversely, the pause interval is decreased to its established minimum before increasing the cycle on-time interval. The system is predisposed to remain in the cycling mode whereby predetermined temperature variations from set point, in a direction opposed to system control, initiate a continuous on-time to bring the temperature back to set point, but only after attempting to do so with an additional modified cycle. Degree transition time and initial pause and intervals are re-established during each continuous mode. Cost savings provided by cycling, as compared to continuous, are periodically computed.

126 Claims, 15 Drawing Figures

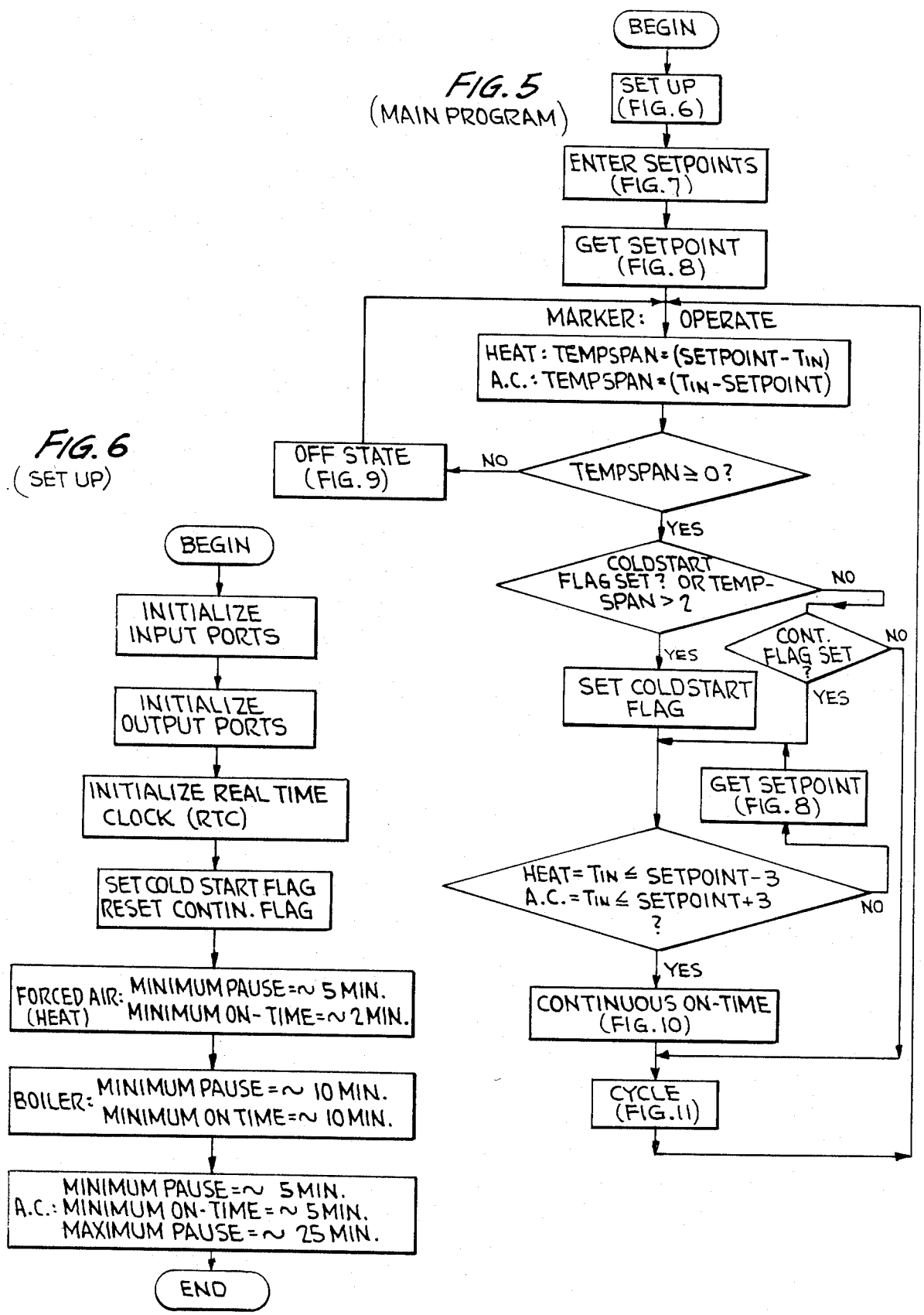

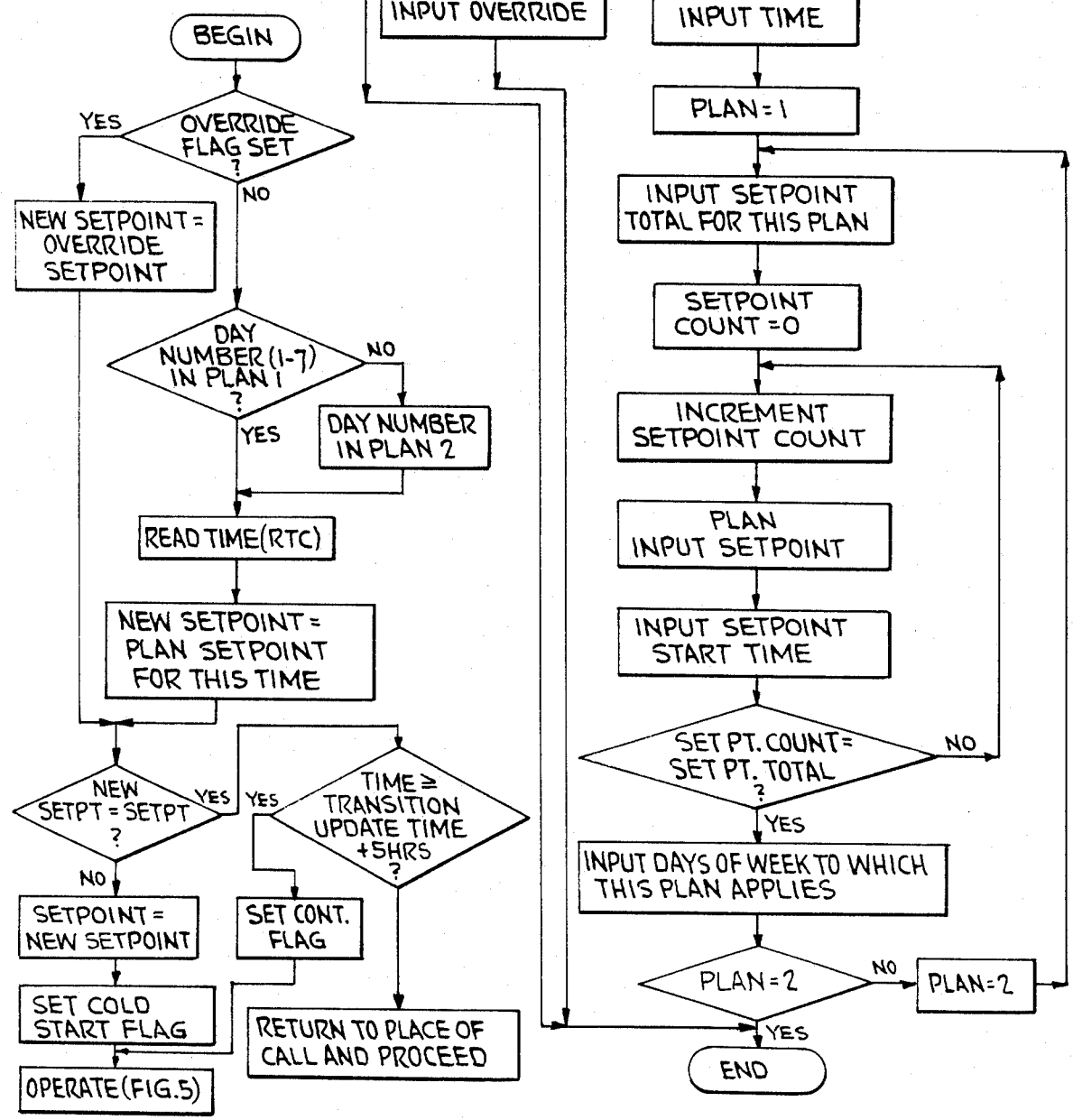
FIG. 7 (ENTER SETPOINTS)
FIG. 8 (GET SETPOINT)

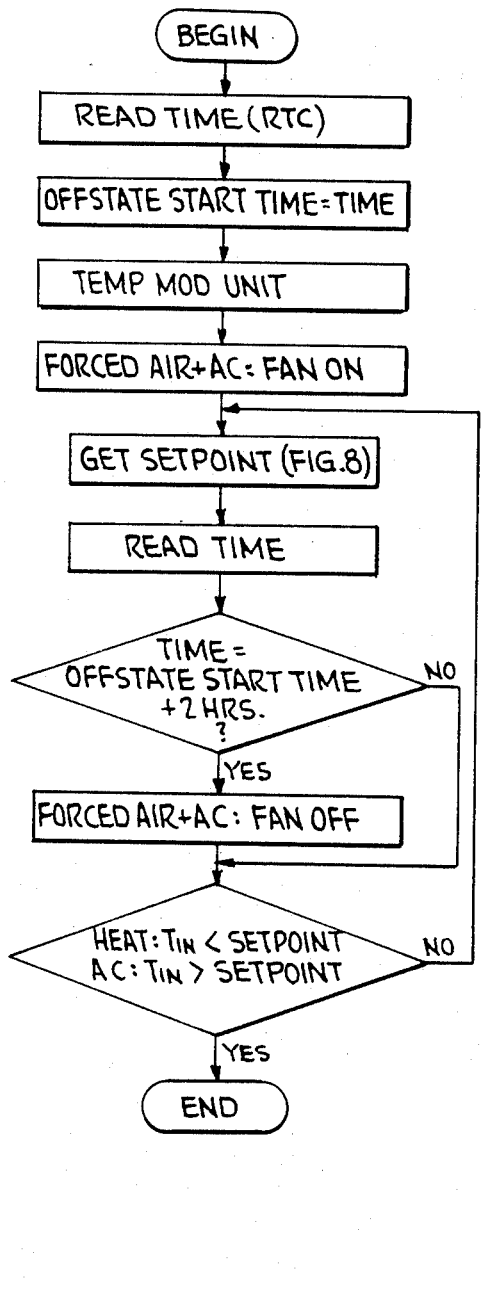
FIG. 9 (OFF STATE)
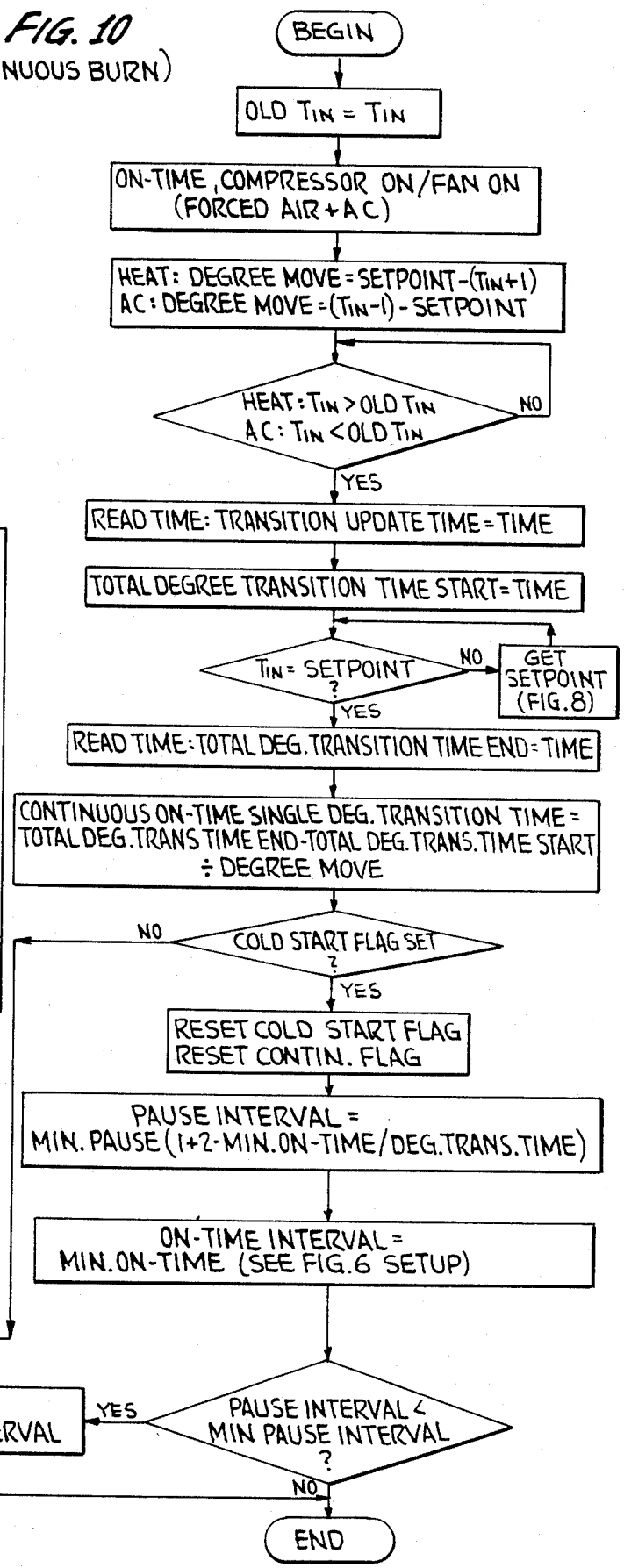
FIG. 10 (CONTINUOUS BURN)

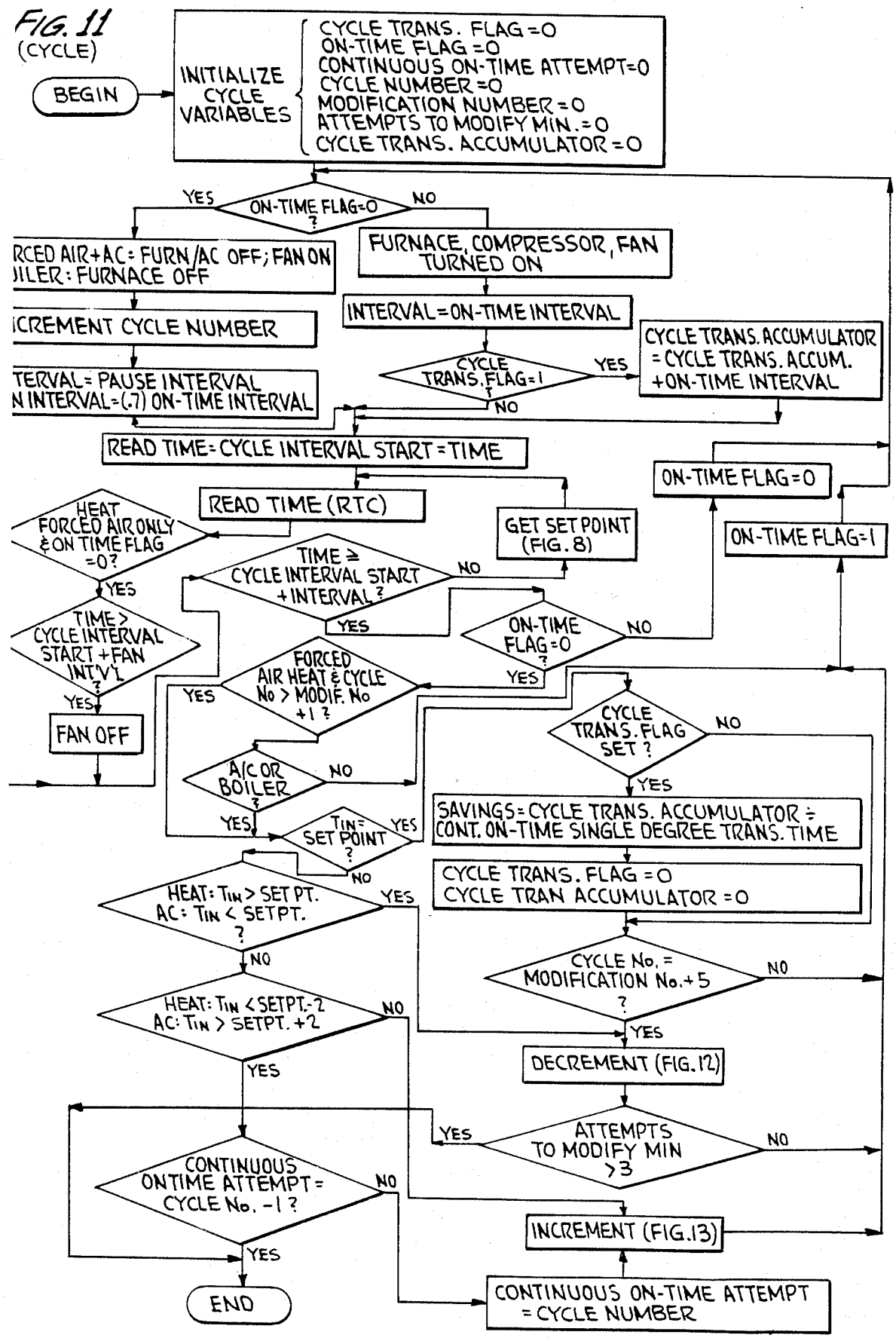

(DECREMENT)

(INCREMENT)

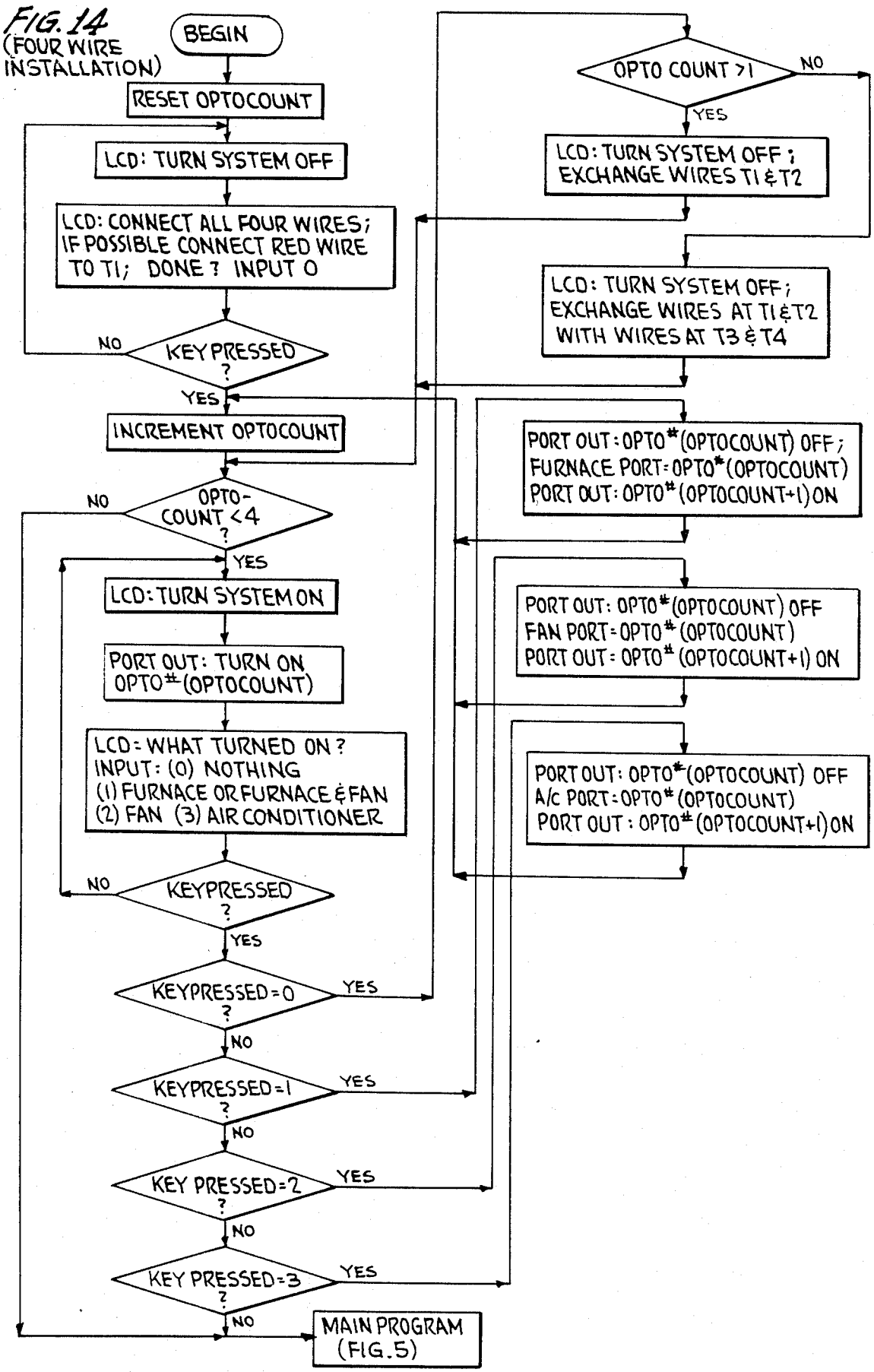

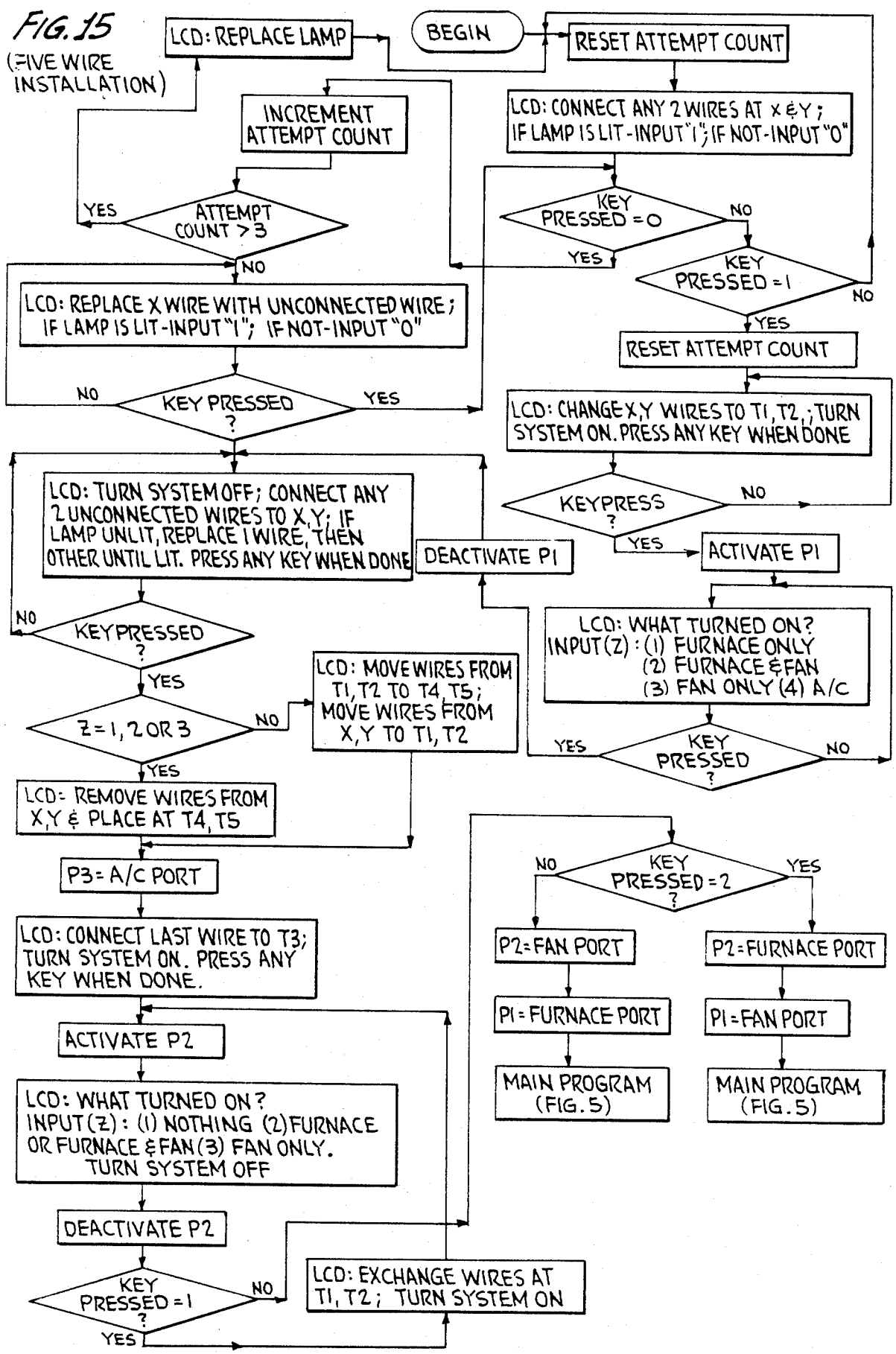

ELECTRONIC THERMOSTAT EMPLOYING ADAPTIVE CYCLING

BACKGROUND OF THE INVENTION

1. Technical Field

The present invention relates to electronic thermostats for heating/cooling systems and, more particularly, to thermostats employing a user-interactive microprocessor controlled by unique software which:
(1) operates the system in a cycling mode to optimize efficient energy utilization; and
(2) facilitates installation and user interaction.

2. Discussion of the Prior Art

It has been recognized that more efficient use of a heating/cooling system is achieved by operating the system in a cycling mode in which relatively short on and off time periods are employed. In the description set forth herein, the "on" portion of each cycle is referred to as the on-time interval of the furnace (forced air or boiler) or air conditioner; the "off" portion is referred to herein as the "pause" interval. In some systems adaptive cycling is employed such that the relative and absolute durations of the on-time and pause intervals vary automatically as a function of the temperature in the temperature conditioned space. For example, in U.S. Pat. Nos. 4,199,023 (Phillips) and 4,460,123 (Beverly) the on-time and pause portions of a fixed duration cycle are varied as a function of temperature. In U.S. Pat. No. 4,356,962 (Levine '962) the on-time interval is changed for each cycle in accordance with the temperature change produced by the on-time interval of the previous cycle. In U.S. Pat. No. 4,408,711 (Levine '711) the on-time interval is adaptively modified to drive the conditioned space temperature to one limit of a dead zone which straddles the temperature set point; the pause interval is likewise modified to permit the temperature to return to the other limit of the dead zone.

The fixed duration, variable duty cycle approach employed by Phillips and Beverly is unable to maintain the temperature in the conditioned space precisely at the desired set point temperature. As a consequence, the temperature continuously varies back and forth between the limits of a dead zone range, typically on the order of three degrees. Apart from any discomfort which may be caused by this variation, the requirement of heating/cooling the space by these three degrees during each cycle results in inefficient use of the system. In the variable length cycles described in Levine '962 and Levine '711, the basic design philosophy requires temperature fluctuations over a dead zone range, thereby resulting in the same disadvantages brought about by fixed duration cycling.

The Phillips patent, noted above, expressly recognizes that the efficiency of fossil fuel furnaces depends somewhat on heat transfer exchange characteristic that are time dependent. Specifically, typical home furnaces are described as having time constants of about two minutes; that is, exhaust products reach approximately sixty-two percent of the final temperature in a two minute period. During the interval of the time constant the heat exchanger reaches a relatively high temperature and thereafter its ability to absorb heat decreases. It is also known that a higher percentage of the combustion heat is transferred to the heat exchanger when the walls are relatively cool. Therefore, Phillips reasons, the cycle on-time interval should last less than two minutes and the pause interval should be greater than one minute. In spite of this recognition, Phillips permits the on-time interval to exceed the two minute limit by as much as one hundred percent and permits pause intervals as short as one-half minute. While the facts on which Phillips bases system operation are valid, we have found that the facts have been improperly applied and, to some extent, are incomplete. Specifically, if the on-time interval is allowed to be shorter than the furnace or air conditioner time constant, the heat exchanger walls will not be permitted to reach the point of maximum absorption of thermal energy. Since considerable energy is required to impart thermal inertia to the furnace/air conditioner (i.e., to begin the process of thermal energy absorption by the heat exchanger walls), it is quite wasteful of energy to not permit the walls to reach maximum absorption once thermal inertia has been initiated. Moreover, if the furnace/air conditioner time constant is permitted to determine the maximum permissble on-time interval and minimum permissible pause interval, it is not hard to imagine temperature demands which could not be met by the system (i.e., the temperature in the conditioned space could not achieve setpoint). it is not surprising, then, that Phillips permits the on-time interval to exceed the stated maximum. Another factor leading to inefficiency in the Phillips system is the acceptance of the dead zone philosophy whereby each on-time interval is required to drive the temperature three degrees and each pause interval is required to permit the temperature to drift back by that same three degrees.

It is also known in the prior art that the compressor of an air conditioner unit can be severely damaged if, after being turned on and then turned off, the compressor is re-started before all the liquified refrigerant, that may have drained into the compressor, has vaporized. The problem is described, for example, in U.S. Pat. No. 4,453,590 (Holliday et al). In a cycling system this factor places a minimum on the pause interval, which minimum is considerably larger than the minimum pause interval permitted for a furnace. None of the prior art electronic thermostats are capable of accommodating these different minimum pause intervals in a common thermostat control for heating and cooling.

Apart from measured temperature conditions in the conditioned space, we have found that there are other characteristics which have an important bearing on the on-time and pause intervals required to effect optimum efficiency at any given time. For example, the time required to produce a given temperature change in the conditioned space may vary with outside temperature, the number of occupants in the space, activities within the space, the open/closed condition of doors and windows, etc. It is important, therefore, to know the Degree Transition Time of the space at all times so that the cycle on-time and pause intervals can be relatively selected at the onset of cycling for optimum efficiency. The parameter "Degree Transition Time" as used herein relates to the time required to raise the temperature in the conditioned space by one degree. The concept of degree transition time is described in U.S. Pat. No. 4,172,555 (Levine '555) in conjunction with predicting the time for energizing a heating/cooling system so that a system can be activated sufficiently in advance of a set point change to bring the temperature in the conditioned space to the set point at the required time. There has been no recognition in the prior art that the degree transition time parameter may be utilized to select cycle on-time and pause intervals for optimum fuel efficiency.

All prior art adaptive cycling thermostats are applicable to forced air systems but none relate to boiler-type heating systems which heat a conditioned space by radiation and/or convection. In fact, we have found that cycling is extremely effective in improving the efficiency of boiler type heating systems, particularly when cycling is utilized in accordance with the principles of the present invention. Surprisingly, these principles are applicable to controlling air conditioning systems, forced air heating systems, boiler type heating systems and any other temperature control system for a conditioned space.

There are numerous electronic thermostats known in the prior art, some of which are disclosed in U.S. Pat. Nos. 4,172,555 (Levine '555); 4,199,023 (Phillips); 4,206,872 (Levine '872); 4,356,962 (Levine '962); 4,408,711 (Levine '711); 4,460,123 (Beverly); 4,469,274 (Levine '274); and 4,473,183 (Kensinger et al). Some of these electronic thermostats include microprocessors controlled by specifically formulated software designed to effect intended heating/cooling system operation. Specifically, the aforementioned Beverly patent discloses a thermostat utilizing a microprocessor. All prior art electronic thermostats have been difficult for the average home owner to use in two distinct areas, namely:

(a) installation of the thermostat, particularly when an existing thermostat is replaced in a pre-existing heating/cooling system; and (b) interaction with the thermostat to enter set points for various days and times.

With respect to the installation problem, the wires of an existing system are not labeled as to function, (i.e., burner, fan, air conditioner, voltage supply, etc.) and it is quite likely that the wires can be improperly connected, possibly causing damage to system equipment. Consequentially, the installation of prior art electronic thermostats, has required trained personnel.

With respect to ineracting with the system, there are prior art thermostats which permit different set points to be programmed into the system at different times. However, the set point entry procedure is so complicated that at least one consumer magazine has made a blanket recommendation to consumers that they should not purchase any of the programmable systems because of the programming difficulties.

OBJECTS AND SUMMARY OF THE INVENTION

It is therefore an object of the present invention to provide an electronic thermostat for controlling forced air heating/cooling systems and boiler-type heating systems in a manner resulting in greater fuel efficiency than has heretofore been possible.

It is another object of the present invention to employ a cycling technique in an electronic thermostat which maintains the temperature in the conditioned space precisely at set point rather than oscillating the temperature between the limits of a dead zone range.

Another object of the present invention is to provide an electronic thermostat utilizing cycling in a manner which places unalterable minimum time limitations on cycle on-time and pause intervals so as to maximize the efficiency of and prevent damage to the heating/cooling system.

It is the further object of the present invention to measure and utilize degree transition time in a conditioned space to permit selection of optimally efficient cycle on-time and pause intervals.

Yet another object of the present invention is to provide a method and apparatus for facilitating installation of an electronic thermostat such that improper connections and resulting damage are virtually eliminated.

In accordance with the present invention an electronic thermostat is controlled by a microprocessor programmed to utilize the temperature of the conditioned space and the current degree transition time of that space to select cycling on-time and pause intervals that maintain the temperature precisely at a selected set point. Minimum on-time and pause intervals are established on the basis of equipment efficiency and/or safety considerations are not violated during operation of the system. In effecting modifications in the on-time and pause intervals in response to temperature changes in the conditioned space, the thermostat seeks first to bring the on-time interval to its established minimum before increasing the pause interval, thereby minimizing fuel consumption at all times. Different on-time and pause intervals are established for different equipment so that forced air or boiler-type heating systems, and cooling systems, can be controlled by a common microprocessor program. A temperature change, opposite to the controlled direction, of a predetermined amount from set point, (e.g., greater than two degrees from set point) results in a mode change from cycling to continuous on-time until the temperature is driven back to the set point, at which time cycling is resumed. However, before changing to the continuous on-time mode the system attempts one additional cycle to assure that the temperature variation in the conditioned space was not caused by a transient circumstance and/or can not be corrected by the additional cycle. In this manner the system exhibits a pre-disposition toward remaining in the energy-efficient cycling mode. If the temperature goes beyond the set point (i.e., in the driven direction), the system attempts to decrease the on-time interval and, if the temperature does not return to the set point after a predetermined number of cycles (e.g., five cycles) using the minimum on-time interval, an off state is established in which the system awaits a return of the temperature to the set point.

During each continuous on-time mode a new Degree Transition Time is measured for continuous on-time operation. The new Degree Transition Time is employed to establish the initial pause interval for the next cycling mode; the initial on-time interval is chosen as the minimum on-time interval. During cycling the cycling Degree Transition Time is measured so that a relative cost saving can be computed as a function of the continuous on-time and cycling Degree Transition Time. This cost saving is available for display to the consumer or operator of the system. In addition, a continuous on-time mode may be established periodically (e.g., at specified times of day, or every so many hours, etc.), whether or not temperature conditions so dictate, in order to permit the Degree Transition Time to be updated.

By constantly seeking to minimize the on-time interval to its minimum permissible value, the cycling mode of the present invention permits the system heat exchanger to be brought to its optimum thermal transfer temperature while minimizing the possibility of a on-time interval extending into heat exchanger saturation in which thermal transfer is no longer efficient. Thus, while there is no theoretical maximum for the on-time interval, the thermostat automatically seeks minimization of that interval. The pause interval, on the other hand, has a minimum value consistent with equipment operation and/or safety, but this minimum value is not sought; rather, the system seeks to maximize the pause interval in order to maintain the temperature at set point in the conditioned space. There is no theoretical maximum value for the pause interval.

When the thermostat is controlling forced air heating operation, the system fan may be turned off at a predetermined time after initiation of each pause interval in order to avoid recirculation of cool air after the furnace heat exchanger has cooled down. This predetermined time is chosen as a pre-established percentage of the current on-time interval (e.g., seventy percent for some systems). Where temperature stratification in the conditioned space can cause considerable vertical temperature variation therein, the fan may be kept on for the entire pause interval.

Installation of the thermostat is achieved with the aid of instructional software arranged to successively prompt the homeowner, in his native language (e.g., English), to make certain connections and to actuate certain equipment. Likewise, the prompting provided by the software during the entry of set points into the system is displayed in the native language of the system user.

BRIEF DESCRIPTION OF THE DRAWINGS

The above and still further objects, features and advantages of the present invention will become apparent upon consideration of the following detailed description of preferred embodiments thereof, especially when taken in conjunction with the accompanying drawings, wherein like reference numerals in the various figures are utilized to designate like components, and wherein:

FIGS. 5 through 15 are flow charts of the software employed with the microprocessor of FIG. 1 to effect the operations required in accordance with the present invention, wherein:

FIG. 5 illustrates the main program for the microprocessor;

FIG. 6 illustrates the initialization or set up routine;

FIG. 7 illustrates the routine for entering temperature set points into the microprocessor;

FIG. 8 illustrates the routine whereby the microprocessor retrieves various temperature set points for use in system operation;

FIG. 9 illustrates the routine for the off mode of system operation;

FIG. 10 illustrates the routine for the continuous on-time mode of system operation;

FIG. 11 illustrates the routine for the cycling mode of system operation;

FIG. 12 illustrates the sub-routine for decrementing the on-time interval and/or incrementing pause interval in the cycling mode;

FIG. 13 illustrates the sub-routine for incrementing the on-time interval and/or decrementing the pause interval in the cycling mode;

FIG. 14 illustrates the routine for interaction with the system user to instruct proper connection of the thermostat to a four-wire heating/cooling system such as illustrated in FIG. 3 of the accompanying drawings; and FIG. 15 illustrates the routine for interaction with the system user to instruct proper connection of the thermostat to a five-wire heating/cooling system such as illustrated in FIG. 4 of the accompanying drawings.

DESCRIPTION OF THE PREFERRED EMBODIMENTS

Figure 1:
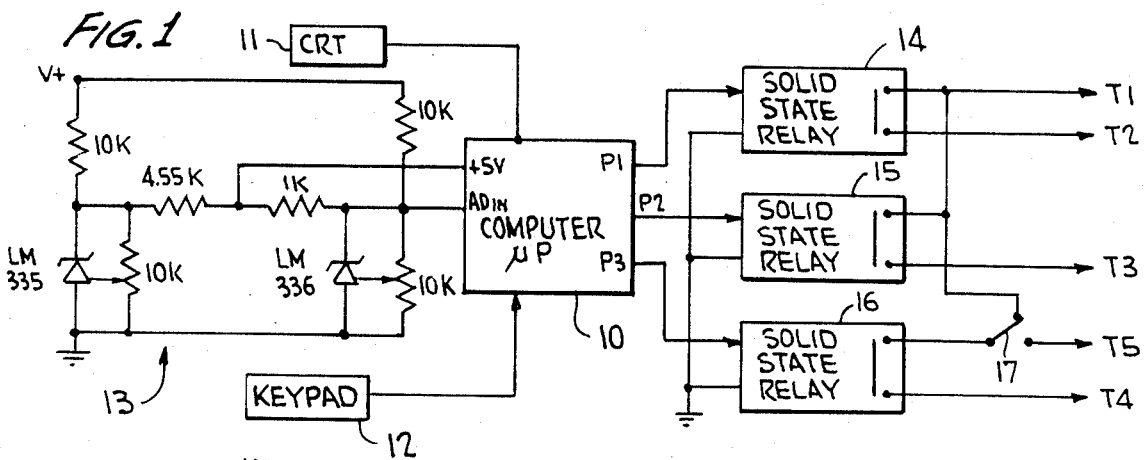
FIG. 1 is a schematic diagram of the microprocessor-controlled thermostat of the present invention showing the interconnections between the microprocessor and the temperature sensor, and between the microprocessor and the heating/cooling system.

The electronic thermostat of the present invention is illustrated schematically in FIG. 1 of the accompanying drawings to which specific reference is now made. The thermostat includes a microprocessor 10, a display unit 11, a keypad 12, circuitry 13 for providing a measured temperature-indicative signal to the microprocessor, and solid state relays 14, 15 and 16 for connecting the microprocessor to the heating/cooling system. Microprocessor 10 may be any commercially available microprocessor capable of functioning in a manner consistent with the description set forth herein. In a prototype version of the invention which has been constructed and tested, a Commodore Model 64 computer was utilized for microprocessor 10; a Hewlett Packard Model HP-871 is also suitable. Display unit 11 may be any cathode ray tube (CRT) display unit compatible with the particular microprocessor employed. Alternatively, a light emitting diode or liquid crystal display unit may be employed. Keypad 12 may also be any input keypad (or keyboard) device compatible with the microprocessor.

The temperature indication circuit 13 is the Fahrenheit Thermometer Application Circuit illustrated in the National Semiconductor Linear Databook, 1982 edition, at page 9-29. That circuit provides an accurately calibrated analog signal representative of the ambient temperature, in degrees Fahrenheit, to which the precision temperature sensor LM 335 (National Semiconductor Corporation) is exposed. Typically, the precision temperature sensor is disposed in a room, home, or other space to be heated and/or cooled by the system controlled by the thermostat of the present invention. Circuit 13 includes a voltage reference diode LM 336 (National Semiconductor Corporation) connected as a 2.5 volt reference having a temperature coefficient that is independent of its breakdown voltage. The temperature indicative output signal from circuit 13 is connected to the analog-to-digital converter input port of computer 10. Power for the circuit is provided from the +5 volt supply terminal of the computer. It will be understood that the particular circuit 13 illustrated in FIG. 1 is only one example of many temperature responsive circuits that may be employed with the present invention.

The solid state relays 14, 15 and 16 serve to connect the computer 10 to the heating/cooling system via system wires T1, T2, T3 and T4, in the case of a four-wire system, or wires T1, T2, T3, T4 and T5, in the case of a five-wire system. Solid state relays 14, 15 and 16 are preferably opto-isolators, such as Opto 22 Model MP 120 D2, and are selectively energizeable by computer 10, under software control, to close circuit contacts connected to the system wires. Any other switching circuits capable of providing the functions described herein maybe used in place of the preferred opto-isolators. In the illustrated embodiment the energizing input circuit for each solid state relay is referenced to ground, relay 14 is energized via computer output port P1, relay 15 is energized via computer output port P2, and relay 16 is energized via computer output port P3.

The solid state relays are employed as part of the feature of the present invention which permits foolproof proper connection of the thermostat to the wires of the heating/cooling system during installation. To this end, one side of the contact for each of relays 14 and 15 is connected to wire T1; the same side of the contact for relay 16 is connected through a switch 17 to wire T1 when switch 17 is in its illustrated position. Switch 17 is placed in the illustrated position when the heating/cooling system is a four-wire system; the switch is placed in its other position when a five-wire system configuration is being served by the thermostat. Five-wire systems are typically used when the air conditioner has a voltage supply transformer that is separate and apart from the heating system supply transformer. The other side of the contacts for relays 14, 15 and 16 are connected to wires T2, T3 and T4, respectively. Switch 17 connects wire T5 to the first-mentioned side of the contact of relay 16 for the five-wire system.

FOUR-WIRE INSTALLATION

Figure 2:
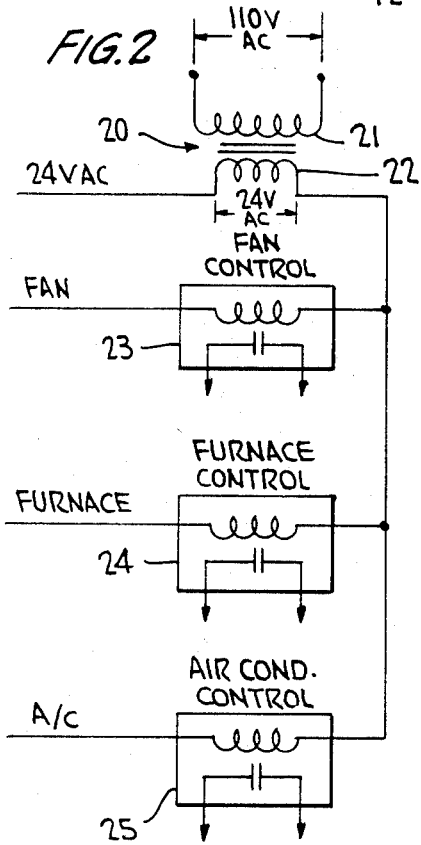
FIG. 2 is a schematic diagram of a conventional four-wire forced air heating/cooling system to which the circuit of FIG. 1 can be connected in accordance with the present invention.

A typical and conventional four-wire heating/cooling system is illustrated schematically in FIG. 2 to which specific reference is now made. Primary power, typically 110 volts, 60 Hz, is applied across the primary winding 21 of a transformer 20 and is stepped down to 24 volts across secondary winding 22. A 24 V AC line is one of the four-wires of the system to be connected to the thermostat and is derived from one side of secondary winding 22. The other side of the secondary winding is connected to one side of each of three relay coils for the fan control relay 23, the furnace control relay 24 and the air conditioner control relay 25, respectively. The opposite sides of these three relay coils are the Fan, Furnace, and A/C wires constituting the other three wires of the four system wires. It will be appreciated that when the 24 V AC line is connected to any or all of the other three wires via solid state relays 14, 15, 16 (FIG. 1), the relays associated with those wires are energized thereby to close the contacts associated with the energized relay and turn on the appropriate function (i.e., fan, furnace, air conditioner).

In order for the thermostat to operate, it is important that the 24 V AC line be connected as wire T1 (FIG. 1) to one contact side of each of the solid state relays 14, 15 and 16. The Fan, Furnace and A/C lines are connected to the other sides of respective relays so that energization of each relay effects the appropriate furnace function. Connection of any two lines other than the 24 V AC line to the contacts precludes operation of the functions associated with those lines. Since the wires from the furnace are not labeled by function and are, more often than not, uncoded, it is unlikely that the 24 V AC line will be connected to the T1 wire by mere chance.

Consequently, the software stored in computer 10 is provided with an interactive installation program or routine for a four-wire system. The flow chart for that program is illustrated in FIG. 14 to which specific reference is made in the following discussion.

Entry into the four-wire installation routine maybe initiated by the entry of a particular combination of digits from keypad 12 (FIG. 1) that is recognized by the computer as a request to begin a four-wire installation procedure. The particular combination of numbers to be entered would typically be described in the installation instructions provided with the thermostat. (A different number combination code would be required for entry into a five-wire installation proceedure under the control of the software routine illustrated in FIG. 15). For the four-wire installation, a parameter designated "Optocount" is established and represents, at any time, one of the solid state relays 14, 15, 16, or none of these relays. At the start of the procedure the Optocount is reset and the installer is instructed, at display 11, to turn the heating/cooling system off. This, and all other displayed instructions, appear in the English language or other national language of the country in which the system is installed. After the system has been turned off, as would typically be signified by the actuation of a key at the keypad 12, the installer is instructed to connect all four wires from the heating/cooling system to respective wires T1 through T4. The instruction indicates that the red wire, if any, should be connected to T1 since red is often used to code the hot or power wire and may, therefore, be the 24 V AC line. In any event, after all four wires are connected, irrespective of whether or not they are correctly connected by function, the installer is instructed to depress the 0 key at keypad 12. When this has been done the Optocount is incremented by one count to a count of one to represent port P1 and solid state relay 14. Since at this time the Optocount is less than four, the installer is instructed to turn the system on. In addition, the output port (in this case P1) of computer 10 corresponding to the Optocount delivers a signal to energize the solid state relay associated with that Optocount. In other words, solid state relay 14 is energized. The installer is then asked to indicate, by depression of an appropriate key at keypad 12, what occurred by virtue of the system having been turned on and solid state relay 14 having been energized. With relay 14 energized, T1 and T2 are shorted together. If one of the four lines connected to T1 or T2 is the 24 V AC line, then either the fan, the furnace or the air conditioner will be activated by the energization of relay 14 since the other connected line will be the FAN, FURNACE, or A/C line. If the installer depresses a "0", signifying that neither the fan, the furnace nor the air conditioner were activated, the Optocount is examined to determine whether or not it exceeds a value of one. Since, under the assumed conditions, the Optocount is equal to one, the result of the examination is negative. The program then instructs the installer to exchange the wires connected at T1 and T2 with the wires connected at T3 and T4; the installer is also instructed to turn the system off. Following this the software then loops back to repeat the previous steps beginning with a determination as to whether or not the Optocount is less than four. This time, however, one of the two leads connected to T1 and T2 will be the 24 V AC lead so that the installer, after turning the system back on, enters either "1" (signifying that the furnace or furnace and fan have been energized), "2" (signifying that the fan only has been energized), or "3" (signifying that the air conditioner has been energized). The software then makes one or more inquiries to determine which of the keys has been pressed by the installer. Assuming that the installer presses the "1" key, the computer output port corresponding to the Optocount is de-activated to deenergize the corresponding solid state relay (in this case relay 14). Since the "1" key indicated that the furnace had been energized, the computer port corresponding to the Optocount (namely P1) is designated as the furnace port. The next output port P2, corresponding to Optocount plus one, is then activated to energize solid state relay 15. The software then loops back to the point in the loop where the Optocount is incremented.

With the Optocount now at a value of two, the procedure repeats so that the installer is once again requested to enter a numeral corresponding to what is observed when the system is turned on. At this time, since the 24 V AC and FURNACE lines are connected at T1, T2, the only possibilities when the system is turned on are that nothing happened, the fan was energized or the air conditioner was energized. The possibility of nothing happening occurs only when the 24 V AC line is connected to T2 rather than T1, the latter being tied to one side of each of the relays 14, 15 and 16. Assuming this to be the case, a "0" is entered by the installer and, since the Optocount is greater than one, the installer is prompted by the display to exchange the two wires at T1 and T2. At this point in time the 24 V AC line is properly connected to T1 and the FURNACE line is connected to T2. Further, the FAN and A/C lines are connected at T3 and T4, although not necessarily in that order. The software now loops back to the point where the determination is made as to whether or not the Optocount is less than four.

Once again the installer is prompted to turn the system on and the computer output port (P2) corresponding to the current Optocount is activated, thereby energizing solid state relay 15. Only two possibilities now remain, depending on whether the FAN or A/C line is connected to T3. If the FAN line is so connected, a "2" will be pressed by the installer and detected by the system. As a result the P2 output port of computer 10, corresponding to the current Optocount, is deactivated and designated as the fan port. The P3 port, corresponding to a value of the Optocount plus one, is activated to energize relay 16. The software then loops back to the point at which the Optocount is incremented to a value of three and output port P3 is activated.

After the system is turned on, the only remaining possibility is that the air conditioner is energized, in response to which the installer enters the numeral "3" via keypad 12. The software deactivates the P3 port, designates that port as the air conditioner port and activates the computer port corresponding to output port plus one. This port is not connected to the system so that no effect is observed. The software loops back to the point at which the Optocount is incremented and a determination is now made that the Optocount is not less than four; in fact, the Optocount is equal to four. Under these circumstances the system recognizes completion of the installation procedure and directs the program to the Main Program described below in relation to FIG. 5.

From the foregoing it will be appreciated that the concept behind the four-wire installation procedure is that the first relay 14 is energized and the installer is required to inform the system as to which of the fan, furnace or air conditioner has been energized. If one of these is energized, the activated port is designated by the system as the port dedicated to the energized component. If nothing is energized the system recognizes that the 24 V AC line has not been connected at T1 or T2 and therefore requires that the pair of wires at T1 and T2 be exchanged with the pair of wires at T3 and T4. Under such circumstances one of the fan, furnace and air conditioner will be energized and the appropriate computer port is assigned to the energized component. Assurance that the 24 V AC line is connected to T1 is provided at the time the P2 port is to be assigned (after the P1 port has been assigned). If none of the components are energized after the P1 port has been assigned, the system recognizes that the 24 V AC line has been connected to T2 rather than T1 and requires the installer to exchange these two wires. The system then proceeds to determine which components are connected to T3 and T4, in response to the installer's key entry, and assigns the computer output ports appropriately.

FIVE-WIRE INSTALLATION

Figure 3:
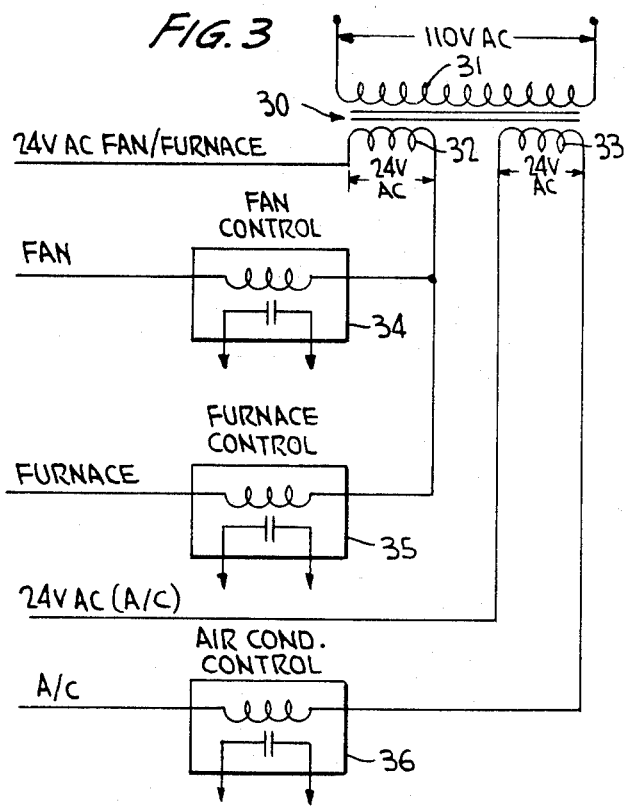
FIG. 3 is a schematic diagram of a conventional five-wire forced air heating/cooling system to which the circuit of FIG. 1 can be connected in accordance with the present invention.

A typical five-wire heating/cooling system is illustrated schematically in FIG. 3 to which specific reference is now made. Primary power is applied across primary winding 31 of transformer 30 and is stepped down to 24 volts at each of two separate and isolated secondary windings 32 and 33. Secondary winding 32 is associated with the furnace and fan and has one side thereof designated 24 V AC FAN/FURNACE. The other side of winding 32 is connected to one side of the relay coils in each of the fan control relay 34 and furnace control relay 35. The other side of the fan control relay coil is the system FAN line; the other side of the furnace control relay coil is the system FURNACE line.

Secondary winding 33 is dedicated to the air conditioner and has one side thereof dedicated 24 V (A/C) and the other side thereof connected to the relay coil in the air conditioner control relay 36. The other side of the air conditioner control relay coil is designated A/C.

Figure 4:
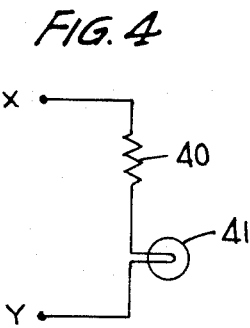
FIG. 4 is a schematic diagram of a lamp circuit employed in the process of connecting the circuit of FIG. 1 to the circuit of FIG. 3.

For installation of the thermostat in a five-wire system, switch 17 (FIG. 1) is switched to connect T5 to one side of the contact for solid state relay 16, thereby isolating that relay contact from the others. This is consistent with the isolation provided between the air conditioner relay 36 and the other two relays 34, 35 by virtue of the separate secondary windings 33 and 32. It will be appreciated that installation of the thermostat in a five-wire system faces one problem which is not present in the four-wire system. Specifically, it is possible that the 24 V AC FAN/FURNACE line might be short-circuited to the separate 24 V AC (A/C) line if these two lines are connected to the same relay 14, 15 or 16 and if that relay is energized. Since the wires are not labeled, the possibility of this improper connection is not remote. Moreover, other undesirable connection combinations may be made, resulting in improper indications and operations of the system. Consequentially, a special lamp circuit, illustrated in FIG. 4 is employed for the five-wire system installation procedure. This lamp circuit includes a resistor 40 and an indicator lamp 41 connected in series between two terminals X and Y. Lamp 41 is typically a 12 volt (AC) lamp, and resistor 40 has a typical resistance of about three hundred fifty ohms. This lamp circuit permits connections to be checked before the relays 14, 15 and 16 are energized, thereby preventing improper and potentially dangerous connections.

The five-wire installation procedure is controlled by software represented by the flowchart illustrated in FIG. 15 to which specific reference is now made. After the Attempt Count parameter (to be described in detail below) is reset, the installer is instructed, in English at display 11, to connect any two of the five system wires (from FIG. 3) across the lamp circuit at terminals X and Y. If lamp 41 lights, it is an indication that one of the connected wires is either the 24 V AC fan/furnace line or the 24 V AC (A/C) line, while the other connected wire is the FAN, FURNACE or A/C line. More particularly, if both connected wires are 24 V AC lines from the two transformers, there is no voltage drop across or current path through the lamp and it will not light. Two connected control lines (FAN, FURNACE and A/C) yield the same result. When there is a voltage drop across the lamp, the lamp lights in spite of the fact that none of relays 34, 35 or 36 is energized because the drop across the lamp acts as a voltage divider preventing the entire twenty-four volts from energizing these relays. Assuming for the present that lamp 41 is not lighted by the two connected wires, the installer is instructed to enter a "0" character via keypad 12. This is detected by the system which then proceeds to increment the Attempt Count parameter and, if the Attempt Count is not greater than three, the system displays a further prompt for the installer. The Attempt Count is used to keep track of the number of times that the installer connects a different pair of the five system wires across the lamp circuit. If more than three connection attempts are made without lighting lamp 41, the system directs the installer to replace the lamp which is assumed to be defective.

Assuming that the Attempt Count parameter is not greater than three, the display prompt instructs the installer to replace the wire connected at terminal X of the lamp circuit with one of the yet unconnected wires. A further prompt instructs the installer to enter a "1", if the lamp lights, or a "0", if it does not light. This procedure continues until the lamp 41 is lighted by the two wires connected to terminals X and Y.

Upon sensing that the key pressed by the installer is not "0", a check is made to be sure that the pressed key is a "1". If any other character was entered, an entry error exists and the system starts the installation procedure over again from the beginning. (Note—although not necessarily described and illustrated in conjunction with other software routines described herein, this return to the beginning of a routine may be incorporated after each character entry if an unacceptable character has been entered by the installer/operator).

If the entered character is a "1", the Attempt Count is reset and the system proceeds with a determination of which lines are connected across the lamp circuit. As part of this procedure the installer is instructed to remove the wires from terminals X and Y and place them at T2 and T1 and, when this is done, to turn the system on. The entry of any character by the installer from keypad 12 signifies that the installer has followed the instructions. (Note—although not necessarily specified in other software routines described herein, this technique of requiring entry of any character to acknowledge completion of a required task may be utilized throughout the system).

Computer output port P1 is actuated after the system has been turned on and an operative pair of wires have been connected to T1, T2. The installer is then prompted to enter a "1" if only the furnace is energized, a "2" if the furnace and fan are both energized, a "3" if only the fan is energized, or a "4" if the air conditioner is energized. A system parameter Z is assigned the value of the pressed key. Once the key is pressed and the value of Z assigned, the installer is instructed to connect any of the two remaining unconnected wires across the lamp circuit at terminals X and Y. If the two wires connected across the lamp circuit do not cause the lamp to light, the installer is instructed to replace one of these wires and then the other with unconnected wires until the lamp is lit. When two of the remaining three wires cause the lamp to light, the installer is instructed to so indicate by pressing any key. At this point the system determines whether or not the parameter Z, as entered by the installer when the system is turned on, is equal to one, two or three. If this is in fact the case, then the pair of wires presently connected across the lamp circuit must be the 24 V AC (A/C) and A/C lines. This is true, because if Z is equal to one, two or three, either the furnace only, the furnace and fan, or the fan only were energized when the system was turned on; the air conditioner was not energized by the two wires connected at T1 and T2. In order for the two wires connected across the lamp circuit at X and Y to cause lamp 41 to light, therefore, these two wires must be the two wires associated with the air conditioner control. Consequently, the air conditioner control lines connected across the lamp circuit should be connected to solid state relay 16 at T4 and T5, and the installer is so instructed if it is determined that the parameter Z is equal to one, two or three. The computer then assigns port P3 as the air conditioner port. On the other hand, if the parameter Z is equal to four, the installer is instructed to remove the two wires connected at T1, T2 and place them at T4, T5. The reason for this is that if the installer entered the character "4" signifying that the air conditioner was energized when the system was turned on, then the two wires connected at T1, T2 are the 24 V AC (A/C) and A/C lines. The installer is also instructed to move the wires across the lamp circuit at terminals X and Y to T1, T2. Port P3 is assigned as the air conditioner port.

After assignment of port P3 as the air conditioner port, the installer is prompted to connect the remaining unconnected wire to T3, and to turn the system on. After this has been done the computer output port P2 is activated and the installer is requested to enter a character indicating which, if any, of the components became energized by energization of relay 15. This entered character, the value of which is assigned as the new value of the parameter Z, is a "1" if nothing was energized, a "2" if the furnace only or furnace and fan are energized, and a "3" if the fan only is energized. The installer is also instructed to turn the system off at this point in time. If a "1" is entered, signifying that nothing was energized by relay 15, the installer is instructed to interchange the wires connected to T1 and T2 and to turn the system on. The software then loops back to the point where port P2 is activated and the installer is once again requested to enter a character indicating which component was energized. If a "2" is entered, the system recognizes that the FURNACE line is connected at T3 and acts accordingly by assigning computer port P2 as the furnace port. This leaves port one as the only unassigned port which must, under the circumstances, be the fan port. Accordingly, the fan port function is assigned to P1.

If the installer enters a "3", indicating that the only fan has been energized in response to activation of port P2, this port is then assigned as the fan port and P1 is assigned the furnace function. In either case, after all of the three computer ports have been assigned a function, the software switches to the Main Program routine described below in conjunction with FIG. 5.

The foregoing installation procedures for the thermostat in either a four-wire or five-wire system, are virtually foolproof in that they prompt the installer, who need not be particularly trained, to make appropriate connections until the correct connection for the system wiring is completed. The correct connection is readily achieved in a short period of time in spite of the fact that the four or five system wires are not labeled as to function.

SET-UP ROUTINE

The main program stored in computer 10 is represented by the flow chart illustrated in FIG. 5 to which specific reference is now made. The first routine performed in the main program is the set up routine illustrated in FIG. 6. Referring to FIG. 6, the computer begins by initializing the input ports and output ports; that is, the various computer ports are identified and reset as necessary in a conventional manner. The computer real time clock (RTC) is then initialized, again in a conventional manner, before setting the coldstart flag and resetting the continuous flag. The coldstart flag is set and the continuous flag is reset prior to entry into a continuous on-time mode. When the system is first turned on, it is required to proceed through a continuous on-time mode in order to establish initial cycling interval values in the manner described hereinbelow. As a pre-condition for this, minimum pause and minimum on-time intervals for the various types of heating or cooling systems are established as part of the set up routine. More particularly, for a forced air furnace heating system one set of minimum intervals are established; different minimum intervals are established for a boiler-type heating system; and still other minimum intervals are established for the air conditioner. These minimum intervals are set in the software for the particular type of heating and/or cooling system being controlled and are not violated irrespective of thermal conditions. As described herein, the minimum conditions are established for purposes of maximizing energy efficiency and/or preventing damage to system equipment. For example, in a forced air heating system it is desirable to permit the heat exchanger, over which the forced air is directed, to be heated at least to the point where its walls just begin to no longer significantly increase in temperature (i.e., to the point of maximum wall temperature). The minimum pause in such a system should be sufficiently long to enable the useful heat stored in the heat exchanger walls during the previous on-time interval to be dissipated into the forced air (it being assumed that the fan remains on for at least part of the pause interval); however, the minimum pause should not be so long as to permit complete cooling of heat exchanger walls, so that the thermal inertia of the heat exchanger can be maintained. For a boiler-type heater the considerations are similar; the water should be heated to close to its maximum temperature during a minimum on-time, and the useful residual heat should be employed during a minimum pause without letting the water cool down completely and thereby destroy the thermal inertia of the system. For air conditioning, the time constants for the refrigerant determine the minimum on-time and pause and also require that a maximum pause be established. Specifically, in order to minimize final consumption and cost, it is desirable to avoid inefficient operation of the air conditioner compressor. The most inefficient operation of the compressor occurs during the cooling of the refrigerant fluid from its gaseous phase to its liquid phase. Efficiency, therefore, dictates that the refrigerant fluid be prevented from cooling down, after on-time, to the gaseous or vapor phase. However, as noted above, if the liquid refrigerant that drains into the compressor is not given sufficient time to vaporize before the compressor is re-started, the life expectancy of the compressor is dramatically reduced. These competing considerations require that the air conditioner pause interval must be long enough (i.e., minimum pause) to permit vaporization of the liquid that has drained into the compressor, but short enough (i.e., maximum pause) to prevent the fluid from warming significantly beyond that point. The minimum on-time for air conditioning must be long enough to assure that even the relatively cool vapor is compressed and that the resulting liquid at least reaches the point where optimum transfer between the liquid and the heat exchange wall is effected.

It is to be appreciated that equipment from different manufacturers may have different minimum or maximum interval requirements for both efficiency and safety and, therefore, the minimum or maximum values programmed into the system are selected in accordance with the requirements of the particular systems with which the thermostat is used. For purposes of the present discussion, the minimum pause interval for a forced air furnace is chosen as five minutes; the minimum on-time interval is chosen as two minutes. For a boiler-type heating system, both the minimum pause interval and the minimum on-time interval are chosen as ten minutes. For the air conditioner, both the minimum pause interval and the minimum on-time interval are chosen as five minutes; the maximum pause interval is chosen as twenty-five minutes.

Upon establishing the minimum pause and on-time and the maximum pause, the set up routine is completed and the program returns to the main program (FIG. 5) and proceeds with the "enter set points" routine illustrated in FIG. 7.

ENTER SET POINT ROUTINE

Referring to FIG. 7, the initial steps of the "enter set points" routine relate to a determination as to whether or not a set point override condition is being terminated or initiated. In this regard it is to be understood that, at any time during operation of the overall program, an interrupt key or code can be pressed by the homeowner at keyboard 12 (FIG. 1) to force the program into the "enter set points" routine. The system, therefore, first determines whether or not the homeowner/operator is attempting to terminate an existing set point override condition. This determination is positive only if the interrupt key has been pressed and the override flag is set. If only one or none of these conditions exist, the determination is negative. Assuming for the moment that the interrupt key has been pressed and that the override flag has been set, the system first resets the override flag and then proceeds to the end of the "enter set points" routine and returns to the main program. If, on the other hand, the interrupt key has been pressed but the override flag is reset, this indicates that the homeowner is attempting to enter an override for the existing temperature set point. Thus, the system determines that an attempt is being made to enter an override set point, the override flag is then set, and a prompt appears at the display requesting the homeowner to enter the desired override temperature. After this has been done the "enter set points" routine is terminated and operation returns to the main program.

If the "enter set points" routine has been entered by any means other than actuation of the interrupt key, a set of prompts appears at the display, in English or other common language, requesting the homeowner to enter various data associated with establishing temperature set points for various times and various days. Again, all prompts to the homeowner appear in his native language (e.g., English). The first prompt instructs the homeowner, to enter a number code corresponding to the present day of the week. For example, if the current day is Sunday, the homeowner enters a "1"; a "2" is entered if the current day is Monday; etc. The homeowner is then instructed to enter the current time of day. The system now establishes that set points are to be entered for plan number one. In this regard, the system as disclosed provides for two possible plans, each plan comprising a twenty-four period which can be subdivided into any number of smaller segments, such as hours, half-hours, etc. By virtue of the "enter set points" routine, the homeowner is able to assign set point temperatures for all or some of the segments within a twenty-four hour plan and then assign that plan to different days of the week. Of course, it will be appreciated that more than two plans may be employed. Typically, however, a homeowner will place weekdays into one plan and weekend days into the other.

After establishing plan number one as the plan for which set points are being entered, the system prompts the homeowner to enter the total number of set points for day of that plan. In other words, if the homeowner desires the temperature set point to have five different values during the day, the numeral "5" is entered into the keyboard. After setting the set point count to zero, the system increments that count by one and instructs the homeowner to enter the first set point temperature. After the first set point temperature is entered, the homeowner is instructed to enter the starting time at which the entered set point is to become effective. If the set point count is not equal to the set point total entered by the homeowner for the plan being processed, the subroutine is repeated until all of the set points and times for that plan have been entered. Once this has been done and the set point count is equal to the set point total, the homeowner is requested to enter the days of the week to which the plan in process applies. This step, although illustrated in the flow chart as a single block, is actually a series of prompts by which the system requests entry of day code numbers and the homeowner responds to each request by entering a day code number. Upon completion of the day code entry, a determination is made as to whether or not plan two is being processed. In the example presently being described, such is not the case; therefore, the system enters plan two and the entire procedure is repeated for entering set points, times, and effective days for plan two. Once that is completed the system leaves the "enter set points" routine and returns to the main program.

GET SET POINT ROUTINE

After exiting the "enter set points" routine and returning to the main program (FIG. 5) the system enters the "get set point" routine illustrated in the flow chart of FIG. 8 to which specific reference is now made. Initially the system determines whether or not the override flag is set as would be the case if the previous "enter set points" routine (FIG. 7) was entered for the purpose of establishing a set point override. If the override flag is set, a new temperature set point is established corresponding to the override temperature entered by the homeowner as part of the "enter set points" routine. If the override flag is not set, the new set point becomes the set point most recently stored in the system for the current day and time by the homeowner as part of a previous "enter set points" routine. In order to establish the new set point from the stored set points, the system first determines whether the current day is part of plan one or plan two. The real time clock is then read and a new set point is established in accordance with the determined plan for the current time of day. It is to be noted that the new set point determined from the plan currently in effect is not necessarily a change of set point; this is because the "get set point" routine is initiated frequently during parts of other routines at times which may not necessarily be set point transition times. If there has been a change, the system reacts differently from the situation where there has been no set point change. Thus, after the new set point has been established, a determination is made as to whether or not the new set point is equal to the set point in effect prior to entry into the "get set point" routine. If there has been no change in the set point a determination is made as to whether or not five hours has passed since the most recent Transition Update Time. The Transition Update Time is established as part of the "continuous on-time" routine (FIG. 10) and is a parameter used to determine the need for computing the cost saving comparison between operation in a continuous on-time mode versus operation in a cycling mode. If the cost saving computation is not included as part of the system, the determination as to whether or not five hours has passed since the last transition update time can be likewise eliminated. The five hour interval is, to some extent, arbitrary and, therefore, any interval can be used. The point here is that ambient conditions, such as outside temperature, change so that the factors affecting comparative cost saving also change. It is therefore important, for purposes of accuracy, that the parameter base for computing cost saving be updated periodically. Of course, as can be seen from the flow chart in FIG. 8, if a new set point is established, the set point parameter is set equal to the new set point, the cold start flag is set, and the system returns to the operate marker on the Main program (FIG. 5). With the colorstart flag set, the system is prepared to enter a continuous on-time mode before entering a cycling mode. If there is no change in the setpoint, and if five hours have elapsed since the last Transition Update Time, the continuous flag is set and the system returns to the operate marker in the main program. If five hours (or other establshed interval) have not elapsed since the most recent Transition Update Time, the system returns to the poiint in the program/routine from which it entered the "get setpoint" routine.

Returning to the main program, (FIG. 5) at the "operate" marker point, a "TEMPSPAN" parameter is established for use in subsequent processing. For heating system operation, TEMPSPAN=SETPOINT—$T_{IN}$; for cooling system operation (e.g., air conditioner) TEMPSPAN=$T_{IN}$—SETPOINT; wherein SET- POINT is the established setpoint currently in effect and $T_{IN}$ is the temperature measured in the conditioned space as established by circuit 13 in FIG. 1. After the TEMPSPAN parameter is established, the system determines whether or not that parameter is equal to or greater than zero. In other words, in a heating mode the system determines whether or not the measured temperature is above the setpoint; in the cooling mode the system determines whether or not the measured temperature is below the setpoint. If the TEMPSPAN parameter is less than zero, meaning that no heating or cooling is necessary to achieve the setpoint, the system proceeds to an off state for which the flow chart is illustrated in FIG. 9. Before proceeding to a description of FIG. 9, however, it should be understood that for purposes of the present description, the measured and set point temperatures are assumed to be digital parameters having minimum increments of one degree Fahrenheit. Thus, in a heating mode, if the temperature in the conditioned space is precisely equal to the set point or less than the set point, the TEMPSPAN is considered to be greater than or equal to zero so that the system does not proceed to the off state. However, if the measured temperature is one full degree or more greater than the set point (as opposed to being some fraction of a degree greater), the system proceeds to the off state. Increments of one degree Fahrenheit have been selected for the present system for purposes of convenience and because the cycling mode, under such conditions, has been found to maintain occupant comfort while minimizing fuel costs. Larger or smaller increments may be employed, if desired, without departing from the principles of the present invention.

OFF STATE

Considering the off state illustrated in FIG. 9, the initial step is a reading of the real time clock followed by establishing the Offstate Start Time parameter as the current time. The temperature modifying unit (i.e., the furnace or air conditioner, depending upon the mode of operation) is turned off but the fan is kept on for forced air heating and air conditioning operation. The program then proceeds to the "get set point" routine (FIG. 8) described above. If there is no new set point, or if five hours have not passed since the last transition update time, the system returns from the "get set point" routine to the "off state" routine in FIG. 9 and reads the real time clock. If the current time is more than two hours after the previously established Offstate Start Time, the fan used for forced air heating and air conditioning operation is turned off. In other words, the fan is maintained on for two hours in the off state in order to prevent temperature stratification in the conditioned space. Of course, if the off state is not maintained for two hours, the fan remains on for the entire off state interval. In either case, the measured temperature is then compared to the set point to see if the temperature is below set point for heating or above set point for air conditioning. If not, the routine loops back to the "get set point" routine and continues in the manner described above until the measured temperature falls below the set point (in heating mode) or rises above the set point (in air conditioning mode) by the one degree minimum increment. Again, as noted above, a one degree minimum increment is assumed for the present description, so that in a heating operation, the temperature must fall at least one degree Fahrenheit below the set point before the off state routine is terminated. Termination of the off state routine brings the system program back to the "operate" marker in the main program (FIG. 5).

Upon returning to the main program from the "off state" routine, the system once again establishes the "TEMPSPAN" parameter. Since the termination of the "off state" routine is predicated on the measured temperature being less than the set point (for heating) or greater than the set point (for cooling), the "TEMPSPAN" value must not be greater than zero. This causes the program to proceed with a determination as to whether or not the coldstart flag is set or the "TEMPSPAN" parameter is greater than two. If neither condition obtains, and if the continuous flag is not set, the main program skips all intermediate steps and proceeds directly to the cycling mode (FIG. 11) described below. If the continuous flag is set, the system skips only the step of setting the coldstart flag but otherwise proceeds in the manner described below.

After determining that TEMPSPAN is greater than zero, if the coldstart flag is set or if TEMPSPAN exceeds two, the next step in the flow chart indicates that the coldstart flag should be set; however, this only is necessary if the system arrives at this point because the TEMPSPAN parameter is greater than two. Assuming that the coldstart flag has already been set, the program proceeds to a determination of whether or not the measured temperature differs from the set point by at least three degrees in the direction opposite to the direction in which the temperature is driven by the heating or cooling system. In other words, if the conditioned space is at least three degrees cooler than the set point in the heating mode, or three degrees warmer than the set point in the air conditioning mode, the program proceeds to a continuous on-time. If this three degree difference does not exist, the program sits and waits until the measured temperature drifts sufficiently to create the three degree difference. In the meantime, the program repeatedly returns to the "get set point" routine to determine whether or not a new set point is to be established. In essence, then, the system does not proceed to a continuous on-time, or coldstart, unless the TEMPSPAN parameter is equal to or greater than 3. For example, the system may be committed to a continuous on-time, or coldstart, by virtue of an override temperature being entered into the system by the homeowner (thereby setting the coldstart flag), or by the temperature dropping at least two degrees below the set point during the cycling mode (described below). However, the system does not permit actual entry into the "continuous on-time" mode, or coldstart, until at least a three degrees difference exists in order to permit the Degree Transition Time parameter to be accurately computed during the "continuous on-time" mode. In other words, measuring the parameters required to compute Degree Transition Time over only a two degree temperature change is not nearly as accurate as doing so over a three degree temperature change. This concept is discussed in greater detail in relation to FIG. 10.

It must be noted at this point that the "continuous on-time" or coldstart mode is considered, from a temperature maintenance point of view, as an undesirable effect in the system of the present invention. However, parameters measured during a "continuous on-time" mode are employed in the computation of the Degree Transition Time which, in turn, is used to establish the initial value for the pause interval in cycling. In addition, the Degree Transition Time during a "continuous on-time" mode is utilized in the computation of cost saving. If the initial value for the pause interval is otherwise determined, or if computation of the cost saving is eliminated or otherwise determined, the frequency of entry into the "continuous on-time" mode may be significantly reduced.

It should also be noted that the determination of whether or not the measured temperature differs from the set point by at least three degrees becomes trivial if that point of the program is reached because of the prior determination that the "TEMPSPAN" parameter is greater than two. Under such circumstances there is no delay before entering the "continuous on-time" mode. It is only when a prior setting of the coldstart flag occurs, such as by virtue of an override temperature being established by the homeowner, that there exists a possibility of a commitment by the system to a "continuous on-time" or coldstart without there actually being a three degree difference between the set point and measured temperature.

CONTINUOUS ON-TIME ROUTINE

The "continuous on-time" or "coldstart" mode is diagrammatically illustrated by the flow chart of FIG. 10 to which specific reference is now made. Initially, the system establishes a parameter designated as "OLD $T_{IN}$" which is set equal to the present measured temperature ($T_{IN}$). The furnace is turned on (or the compressor for the case of the air conditioner) and the fan is turned on in the case of forced air heating and air conditioning. Another parameter, namely "DEGREE MOVE" is established as SETPOINT$-(T_{IN}+1)$ for heating; this parameter takes the value $(T_{IN}-1)-$SETPOINT for air conditioning. A determination is then made as to whether or not the measured temperature is greater than OLD $T_{IN}$ for heating, or less than OLD $T_{IN}$ for air conditioning. Since the minimum temperature increment in the described embodiment is one degree, this determination is effectively a determination that the continuous on-time mode has driven the measured temperature one degree since the initiation of that mode. If not, the system waits until that one degree change is achieved. It is not until the "continuous on-time" mode has driven the temperature in the conditioned space by one degree that the system begins to measure the time interval used in the Degree Transition Time computation. This assures that the heating/cooling system has thermal inertia in its favor before the computation interval is begun. Once the "continuous on-time" mode drives the measured temperature one degree, the real time clock is read and that time is used to establish the "Transition Update Time" and the "Total Degree Transition Time Start". The Transition Update Time is described above in relation to the "get set point" routine (FIG. 8) and signifies the time that a transition update was last begun. The Total Degree Transition Time Start is a parameter designating the start time for the temperature measurement used in computing the Degree Transition Time. After these time parameters are established, the system waits until the measured temperature is driven by the "continuous on-time" mode to the set point temperature. In the interim, the system repeatedly returns to the "get set point" routine which, as a general rule, is initiated substantially anytime during program operation when the system is waiting for a prescribed condition to occur. Assuming that no new setpoint is established, the system continues to wait for the "continuous on-time" mode to drive the measured temperature to the setpoint. When this occurs the real time clock is read again and the time reading is established as the "Total Degree Transition Time End" parameter. With the transition time start and end times available, and the temperature change determined, the system can now compute the Continuous On-Time Single Degree Transition Time which is equal to (TOTAL DEGREE TRANSITION TIME END−TOTAL DEGREE TRANSITION TIME START)−DEGREE MOVE. After the Continuous On-Time Single Degree Transition Time is computed, a determination is made as to whether the system is in a "continuous on-time" mode for the purpose of computing cost saving or to actually effect a continuous on-time as a result of temperature conditions in the conditioned space. In other words, is the coldstart flag set? If the "continuous on-time" mode has been entered only to effect a cost saving computation, the coldstart flag is not set and the system exits the "continuous on-time" routine and returns to the main program (FIG. 5) from which the system enters the "cycle" routine of FIG. 11.

If the system was in a "continuous on-time" because of temperature conditions in the conditioned space, the initial pause and on-time intervals to be used upon the next entry into the cycling mode are re-established. This is accomplished by first resetting the coldstart and continuous flags and then establishing the initial pause interval. The initial pause interval is computed from the following equation:

Pause Interval=MIN PAUSE $(1+2\times$MIN ON-TIME/DEG. TRANS. TIME). In other words, the initial pause interval is established as the sum of the minimum pause (as preset in the setup routine, FIG. 6) plus a fraction of that minimum pause, which fraction is directly proportional to the Continuous On-Time Single Degree Transition Time. Thus, the initial pause is greater than the established minimim paused by an amount which reflects time required to effect a given temperature change (i.e., the present Continuous On-Time Single Degree Transition Time) and also reflects the minimum on-time. The minimum on-time is then established as the initial on-time interval to be employed upon the next entry into the cycle mode. This use of the minimum on-time further reflects the system predisposition toward minimizing the on-time time and, therefore, fuel consumption. By using this initial on-time interval as part of the Initial Pause Interval calculation, the system, in effect, scales or normalizes the initial pause interval to the initial on-time interval so that both intervals in the initial cycle are inter-related. It has been determined empirically that the factor "2" in the Initial Pause Interval Calculation provides desirable results in rendering the initial pause interval compatible with the minimum on-time and the current thermal conditions in the conditioned space. Of course, experience may show that another factor is more suitable for any given heating/cooling system, in which case that factor may be substituted for the factor "2" in the Initial Pause Interval calculation. The important thing, however, is that the initial cycle has the minimum possible on-time interval and a pause interval which is dependent upon the degree transition time (i.e., existing thermal characteristics in the conditioned space) and is scaled to the initial minimum on-time interval.

As an example of how the initial on-time and pause intervals are computed, assume that the operating system is a forced air furnace system and that the Continuous On-Time Single Degree Transition Time is computed as four minutes. Using the forced air (heat) minimum values established in the set up routine (FIG. 6), the Initial Pause Interval becomes 5 (1+2×2/4), or ten minutes. If, using the same heater system, the Continuous On-Time Single Degree Transition Time is computed as ten minutes, the Initial Pause Interval becomes 5 (1+2×2/10), or seven minutes. In both cases the initial on-time interval is the two minute minimum on-time time.

CYCLE ROUTINE

As noted from the main program illustrated in FIG. 5, the continuous on-time mode is always followed by the cycling mode. The cycling mode is controlled by the software routine represented by the flowchart illustrated in FIG. 11 to which specific reference is now made. Initially, upon entering the routine, all of the parameters and flags employed during the routine are reset, including: Cycle Transition Flag; On-Time Flag; Continuous On-Time Attempt; Cycle Number; Modification Number, Attempts to Modify Minimum; and Cycle Transition Accumulator. The first determination in the routine is whether or not the on-time flag is reset. The on-time flag is employed to distinguish between the on-time and pause intervals of a cycle, and "toggles" system operation between the left branch of the flowchart (pause) and the right branch of the flowchart (on-time). Since the on-time flag is reset upon entering the cycle mode, the system always begins with a pause interval upon entering the cycle mode. In the pause interval, the furnace/compressor is turned off; the fan used for air conditioning and forced air heating remains on. Thus, the furnance/compressor is turned off, not as part of the end of a continuous on-time mode, but at the start of the first pause interval in the cycle mode. The cycle number is then incremented by one count to indicate the number of the present cycle. Each cycle includes a pause interval and a on-time interval, and the cycle count is accumulated for the entire time that the system remains in the current cycle mode and is reset upon reentering that mode from some other mode of operation. Incrementation of the cycle count is effected at the start of each cycle pause interval. The value of the "Interval" parameter is set equal to the pause interval presently in force. This value, for the first cycle after entry into the cycle mode, is the initial pause interval established during the continuous on-time mode (FIG. 10) from the latest computed Continuous On-Time Single Degree Transition Time. During subsequent cycles, the pause interval (and the on-time interval) may change in accordance with temperature conditions in the conditioned space, as described in relation to FIGS. 12 and 13. In addition, the parameter "Fan Interval" is established as 0.7 multiplied by the cycle on-time interval presently in force.

Once the Interval and Fan Interval values have been established, the start time for the current cycle interval (pause or on-time) is determined as the present reading of the real time clock. If the pause interval is in effect, and if the system is in a forced air heating operation, a determination is made as to whether or not the current pause interval has been in effect for a time period greater than the established Fan Interval. If so, the fan is turned off for the remainder of that pause interval; if not, the system waits until the pause interval elapses. While so waiting, the "get set point" routine (FIG. 8) is repeatedly evoked to be sure that a set point change is not required. If the heating system is not of the forced air type, the Fan Interval determinative step is eliminated and the system merely awaits completion of the pause interval while repeatedly entering the "get set point" routine.

Upon completion of the current Interval (pause or on-time), a determination is made as to whether the Interval was a pause or a on-time (i.e., is the on-time flag reset?). Assuming that the on-time flag is reset (i.e., a pause interval), if the operating system is a forced air heating system, it is determined whether or not the cycle number exceeds one plus the Modification Number. The Modification Number is a count that is reset upon entry into the cycling mode so that, for the assumed conditions, the cycle number (i.e., one) does not exceed the Modification Number (i.e., zero) plus one. In response to this condition the on-time flag is set and the system "toggles" to the cycle on-time interval (i.e., on-time flag is not equal to zero). The furnace or air conditioner compressor is turned on, as is the forced air fan, and the Interval parameter is set equal to the last established on-time interval time. For the first cycle after entry into the cycle mode after the initial on-time and pause intervals are established during a continuous on-time mode (FIG. 10), the on-time interval time will be the "minimum on-time". If the cycle transition flag is not set (and this is assured here since the flag was reset upon entry into the cycle mode), the system waits until the on-time interval elapses while repeatedly checking to determine whether or not a new set point is being called for ("get set point" routine, FIG. 8). When the on-time interval elapses (i.e., time is equal to or greater than cycle interval start time plus on-time interval), the on-time flag is reset and the system "retoggles" back to the pause interval.

Figure 12:
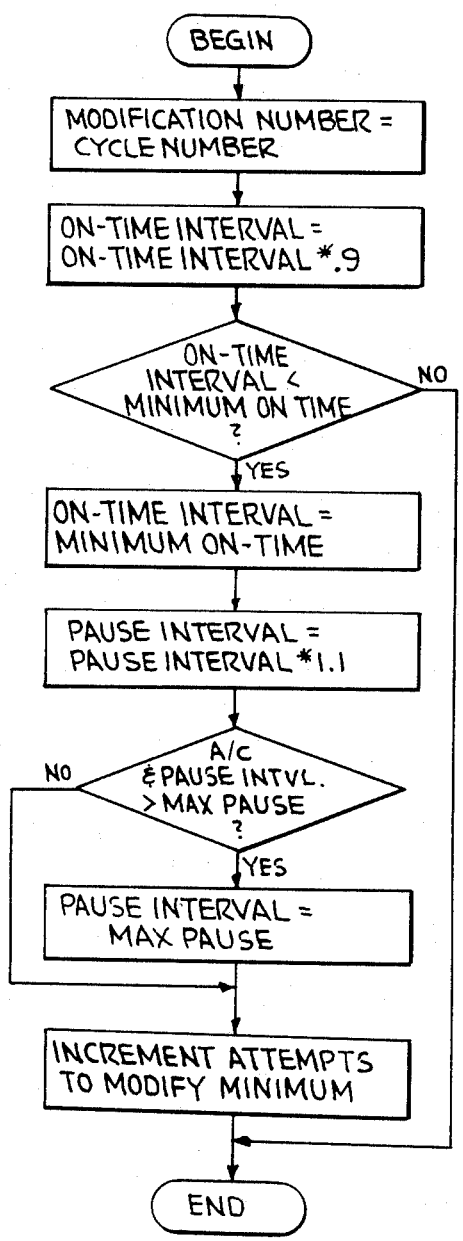
Figure 13:
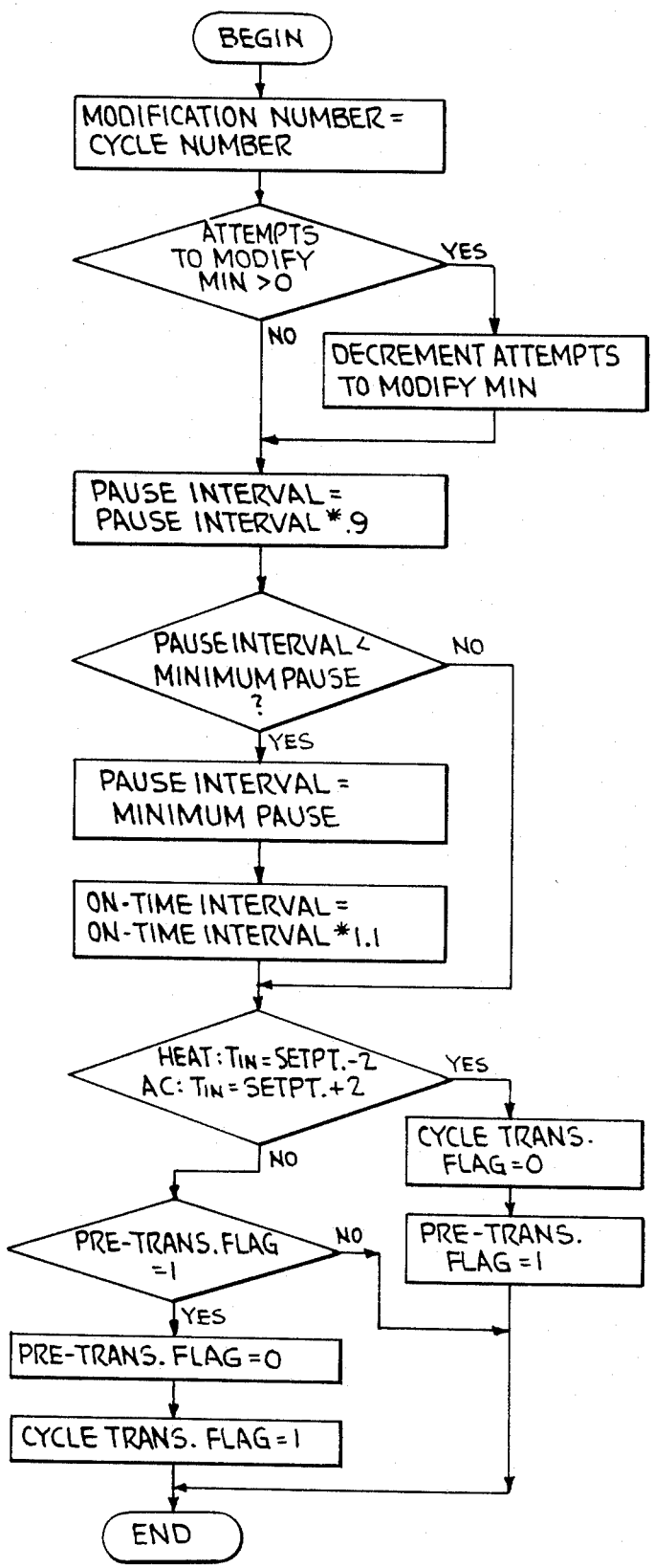

As noted above, at the end of each pause interval a determination is made, when forced air heating is in effect, as to whether or not the present cycle number exceeds the Modification Number plus one. The Modification Number is set equal to the cycle number each time the on-time or pause interval is modified (FIGS. 12, 13). It will be seen, therefore, that for forced air heating at least one full cycle, including an on-time interval, must take place after an on-time or pause interval modification (or after entry into the cycle mode) before any post-pause determinations are made that might result in pause on-time interval modifications, or a cost savings computation, or a mode change. For boiler heating or air conditioning these post-pause determinations are made immediately after every pause interval. The reason for making this distinction between forced air heating on the one hand and boiler/air conditioning operation on the other hand relates to the relatively short on-time intervals effected in forced air heating and to the desirability of precluding the forced air heating system from over-reacting to transient temperature changes, such as would be produced by momentarily opening an outside door or window. In other words, the system is prevented from instituting an interval modification or shifting out of the cycle mode in response to transient temperature conditions. The system fan, which is energized in the on-time interval and for most, if not all, of the pause interval, may be capable of dispersing the transiently cooled air throughout the entire conditioned space so as to restore the temperature to set point and avoid the need for a mode change or interval modification.

Continuing with the discussion of cycling operation at the end of a pause interval, the measured temperature is checked to see if it is still equal to the set point temperature, this having been a condition necessary to enter the cycle mode. If so, the system determines whether or not the cycle transistion flag is set. This flag, which is reset at the time of entry into the cycle mode, is set during the increment sub-routine (FIG. 13) to indicate that a cost savings computation should be made. Assuming for the present that the cycle transistion flag is not set, the cycle number is checked to see if it is equal to the Modification Number plus five. Assuming such is not the case, the on-time flag is set and the cycle routine "toggles" to the on-time interval.

The determination as to whether or not the cycle number equals the Modification Number plus five is part of a feature of the invention which attempts to minimize the on-time time. Specifically, if five consecutive cycles occur without the need to modify the on-time or pause interval, the system attempts to reduce the on-time interval; or if the on-time interval is already equal to the minimum on-time interval, to increase the pause interval. What this amounts to is an attempt at fine tuning the on-time/pause intervals to further reduce energy consumption. Therefore, if the cycle number equals the Modification Number (i.e., the Modification Number is the cycle in which the last interval modification has occurred) plus five, the system proceeds to the decrement sub-routine (FIG. 12) which is described below. If, under the assumed conditions, the present cycle number is not equal to the Modification Number plus five, the system returns to the top of the flowchart and "toggles" to initiate a on-time interval.

There are other conditions which initiate a decrement sub-routine. For example, if after a pause interval it is determined that the measured temperature ($T_{IN}$) is not equal to the set point, a determination is made as to whether or not the conditioned space is too hot (in the heating mode), or too cold (in the cooling mode). In other words, if during heating the measured temperature rises above the set point, the system proceeds to the decrement sub-routine. Likewise, if during cooling the measured temperature falls below the set point, the system proceeds to the decrement sub-routine. Since the minimum discernable temperature increment is one degree Fahrenheit for the examplary operation described herein, a rise or fall of at least one degree beyond set point is necessary in order to initiate the decrement sub-routine. As described below, in the decrement sub-routine the on-time interval is shortened or the pause interval is lengthened, depending upon conditions described in relation to FIG. 12.

If the temperature dose not exceed the set point in heating (or is not less than the set point in cooling) then the temperature must be less than the set point in heating (or above the set point in cooling) since it has already been determined that the temperature is not equal to the set point. However, the system does not react in the same manner when the difference between the set point and the measured temperature is two degrees or more as it would if this difference is only one degree. For a one degree difference (i.e., $T_{IN}$ is less than set point minus two), the system enters the increment routine in which the pause interval is decreased or the on-time interval is increased, depending upon the conditions described below in relation to FIG. 13. For more than a one degree difference, the system determines whether or not to transfer to the continuous on-time mode (FIG. 10). A transfer out of the cycle mode is justified if the difference between the set point and measured temperature is two degrees or more; however, one additional condition must be met. In order to assure that the measured temperature is not a transient condition (such as would result from the temporary opening of a door or window), the system evokes one additional cycle in an attempt to restore the measured temperature to the set point. Thus, if the Continuous On-Time Attempt parameter is not equal to the current cycle number minus one, the Continuous On-Time Attempt parameter is set equal to the current cycle number, and the increment sub-routine is entered. After the increment sub-routine, the system returns to the cycle mode, and if the temperature conditions still justify a transfer out of the cycle mode after the next pause interval, the system returns to the main program (FIG. 5) at the "operate" marker. In other words, the measured temperature must be at least two degrees below the set point during heating or above the set point during cooling for two successive cycles before the system will transfer out of the cycle mode and return to the main program. As described above, upon returning to the "operate" marker at the main program determinations are made as to whether or not a continuous on-time mode is appropriate. This requirement for a two degree difference for two successive cycles before leaving the cycle mode is part of the process of effecting the system preference for remaining in the more efficient cycling mode than the less efficient continuous on-time.

It is noted that after an increment or decrement sub-routine, the system returns to cycling and proceeds with a on-time interval. This is because the determinations which result in entry into the increment/decrement sub-routines are made immediately after a pause interval, meaning that the on-time flag is reset. Upon returning from the increment/decrement sub-routines, the on-time flag is immediately set so that a on-time interval and not a pause interval is evoked. None of the determinations required to modify the on-time pause intervals, or to transfer out of the cycle mode, or to initiate a coat savings computation, are made immediately after a on-time interval; all such determinations are made immediately after a pause interval is completed.

Coat savings computations require a determination of the total on-time time required, during cycling, to move the measured temperature one degree. This time may be, and most often is, accumulated over more than one cycle (i.e., over plural on-time intervals). The accumulated cycling on-time time required to move the measured temperature one degree may then be compared to the Continuous On-Time Single Degree Transition Time, measured during the continous on-time mode, in order to provide a measurement of comparative cost savings produced by the cycling mode. Accumulation of cycle on-time time is effected only at the end of a on-time interval and only if the cycle transition flag is set. This flag is set as part of the increment sub-routine (FIG. 13). described in detail below. As noted above, the increment sub-routine is evoked only if the measured temperature is not equal to set point but: (a) for heating, is no more than two degrees below the set point; or (b) for cooling, is no more than two degrees above the set point. As will be described in detail subsequently, if, during the increment sub-routine, the measured temperature is equal to the set point minus two degrees (for heating), or set point plus two degrees (for cooling), the cycle transition flag is not set. It is only when the measured temperature has been moved one degree (i.e., from a two degree displacement from set point to a one degree displacement from set point) that the cycle transition flag is set. The setting of this flag, therefore, permits the Cycle Transition Accumulator parameter to accumulate the on-time interval time required to move the measured temperature to the set point from one degree away from the set point. In other words, the system must build up inertia in moving the measured temperature from two degrees away from set point to one degree away from set point before beginning the accumulation of on-time interval time. By establishing system inertia before measuring the time required for the cycle mode to effect a one degree change, a more accurate measurement of that time is obtained.

For purposes of the present discussion, it is assumed that the cycle transition flag has been set during an increment sub-routine. At the end of the next on-time interval, the Cycle Transition Accumulator parameter is set equal to its previous value plus the time of the just completed on-time interval. For the first on-time interval of the accumulation process, the previous value of the parameter is zero. It will be seen that each time a on-time interval is completed while the cycle transition flag is set, the on-time interval time is added to the Cycle Transition Accumulator parameter. Before the measured temperature is moved one degree, the measured temperature is not yet equal to the set point, and the system enters the increment sub-routine before each on-time interval and also accumulates the on-time time as the Cycle Transition Accumulator parameter after each on-time interval. When the measured temperature becomes equal to the set point, at the end of the next pause interval, a determination is made as to whether or not the cycle transition flag is set. Since this is assumed for the present discussion, the cost savings are computed by dividing the Cycle Transition Accumulator parameter by the last measured Continuous On-Time Single Degree Transition Time. The cycle transition flag is reset and the Cycle Transition Accumulator parameter is set equal to zero.

One other aspect of the cycle routine bears mention before leaving the description of FIG. 11. Specifically, it is noted that upon return to cycling after the decrement sub-routine is completed, a determination is made as to whether or not the "Attempts to Modify Minimum" parameter is greater than three. This parameter is a count which is reset upon entry into the cycling mode and is incremented or decremented in response to certain conditions as part of the decrement (FIG. 12) and increment (FIG. 13) sub-routines. More particularly, each time the temperature conditions require a shorter cycle on-time interval but the on-time interval is already equal to the Minimum On-Time, the Attempts to Modify Minimum count is incremented. On the other hand, each time the temperature conditions require a longer on-time interval, the Attempts to Modify count is decremented. When a net of four attempts have been made to decrease the on-time interval to less than the Minimum On-Time, the system exits from the cycle routine and returns to the operate marker in the main program (FIG. 5). The philosophy here is that if temperature conditions produce repeated attempts to drive the on-time interval below the established Minimum On-Time, an attempt should be made to enter the offstate (FIG. 9) via the main program.

DECREMENT SUB-ROUTINE

The decrement sub-routine is illustrated in the flowchart of FIG. 12 to which specific reference is now made. Initially, the Modification Number is set equal to the current cycle number. This is followed by reducing the on-time interval by ten percent; that is, the existing on-time interval as multiplied by 0.9 to obtain the new on-time interval. It must be remembered that the purpose of the decrement sub-routine is to reduce the on-time interval because temperature requirements so dictate. Although the temperature requirements can be satisfied by shortening the pause interval, the system strives to reduce the on-time interval first because shorter on-time intervals minimize fuel consumption. After the on-time interval has been reduced by ten percent a determination is made as to whether or not the reduced interval is shorter than the minimum on-time established in the setup routine (FIG. 6). If it is not shorter, the decrement sub-routine is terminated and the system returns to the cycle routine. If the shortened on-time interval is shorter than the minimum on-time, the on-time interval is re-established, this time as the minimum on-time, and the pause interval is made longer by ten percent. The lengthening of the pause interval is effected by multiplying the existing pause interval by 1.1. If the air conditioner is the operative system and if the new pause interval exceeds the maximum pause, as established in the set-up routine (FIG. 6), the new pause interval is set equal to the maximum pause; if neither condition obtains, the lengthened pause interval is retained. Once this is done the Attempts to Modify Minimum count is incremented, after which the system exits from the decrement sub-routine.

As described in relation to FIG. 11, upon exiting from the decrement sub-routine, the system returns to the cycle mode and determines whether or not the Attempts To Modify Minimum count exceeds three. If not, a on-time interval is initiated; if so, the system returns to the operate marker in the main program (FIG. 5). It should be noted that the Attempts To Modify Minimum count can reach a value of four (and thus force the system out of the cycle mode) in a number of different ways. For example, attempts to shorten the on-time interval to less than the minimum on-time may occur in four successive cycles (or four alternate cycles in forced air heating); or in spaced individual cycles occurring over a long period of time and encompassing many cycles; or in such spaced individual cycles interspersed with cycles involving increment sub-routines in which the Attempts To Modify Minimum count is decremented. In the latter situation, for example, assume, after three attempts to reduce the on-time interval below minimum, that the temperature stabilizes so that plural cycles occur without modification to the on-time or pause interval. Assume further that the temperature then changes whereby two increment sub-routines are initiated, thereby decrementing the Attempts To Modify Minimum count from three to one. If, after stabilizing again, the temperature then changes to cause three attempts to reduce the on-time interval below the minimum on-time, the net count becomes four and the system exits from the cycle mode. Further, even if the temperature in the conditioned space remains stable and unchanged over a long period of time, it is possible for the Attempts To Modify Minimum count to reach four and force the system out of cycling. For example, and as described above as part of the cycle mode description, after five successive cycles with no modification of the on-time or pause intervals, the system enters the decrement sub-routine to try a "fine tuning" approach toward reducing the on-time interval (or further increasing the pause interval if the on-time burn interval is at minimum). If the on-time interval is at minimum, each decrement sub-routine includes an incrementation of the Attempts To Modify Minimum count, and the count accumulates until it reaches a value of four. No matter how the net count of four is reached, however, the system philosophy is such that this count value justifies proceeding with an attempt to return to the main program (FIG. 5) to either enter the off state (FIG. 9) or re-establish the on-time and pause parameters. In either case, the system awaits a difference of three degrees between the set point and the measured temperature before returning to the cycle mode, unless a setpoint change or other condition results in the continuous or coldstart flag being set. If either of these flags is set the system enters a continuous on-time mode in response to the three degree difference before returning to the cycle mode.

An important point to note about the decrement sub-routine is that if temperature conditions dictate less relative on-time time in each cycle, reduction of the on-time interval is given preference over extension of the pause interval. It is only when the on-time interval is reduced to its minimum permissible value that the pause interval can be lengthened.

INCREMENT SUB-ROUTINE

The increment sub-routine is represented by the flowchart of FIG. 13 to which specific reference is now made. As in the decrement sub-routine, the Modification Number is initially set equal to the current cycle number. If the Attempts To Modify Minimum count is greater than zero, the count is decremented and then the pause interval is shortened by ten percent (i.e., multiplied by 0.9). If the Attempts To Modify Minimum count is not greater than zero, the system proceeds directly to the step of shortening the pause interval, skipping the step of decrementing the Attempts To Modify Minimum count. Skipping of this decrementation step assures that the Attempts To Modify Minimum count can not have a value of less than zero. If the shortened pause interval is less than the minimum pause, the pause interval is established as the minimum pause, and the on-time interval is increased by ten percent (i.e., multiplied by 1.1). On the other hand, if the shortened pause interval is not less than the minimum pause, the shortened pause interval is retained and the on-time interval is not changed. The system philosophy evident here is that if more relative on-time time is required for each cycle by the measured temperature conditions, preferance is given to shortening the pause interval rather than lengthening the on-time interval. Only if the pause interval is at its minimum permissible value will the on-time interval be lengthened.

After the proper interval modification, a determination is made as to whether or not the measured temperature is equal to two degrees less than the set point (for heating), or two degrees more than the set point (for air conditioning). It will be noted from the cycle routine flowchart (FIG. 11) that the conditions which must exist before the increment sub-routine is entered are: (1) the measured temperature is not equal to the set point; and (2) the measured temperature is not less than the set point minus two degrees (for heating) or more than the set point plus two degrees (for air conditioning). Alternatively, as described above, if there is a three or more degree difference between the set point and measured temperatures, the increment sub-routine may be entered for one cycle in an attempt to bring the temperature back to within two degrees of set point by means of cycling rather than resorting to a continuous on-time.

Assuming that the measured temperature is three or more degrees displaced from the set point, a determination is made as to whether or not the preliminary transition flag is set. This flag will not be set at this time, under the assumed conditions, so that the system exits from the increment sub-routine and returns to the cycle mode to effect a on-time interval using the shortened pause interval or the lengthened on-time interval. If that cycle is sufficient to bring the measured temperature within two degrees of the set point (but still not equal to the set point), then the increment sub-routine is entered once again; if not, the system proceeds via the main program (FIG. 5) to a continuous on-time (FIG. 10).

If the difference between the measured temperature and the set point temperature during the increment sub-routine is determined to be two degrees, the cycle transition flag is reset, the preliminary transition flag is set, and the system returns to the cycle mode using the shortened pause or lengthened on-time interval. The system will return to the increment sub-routine after each pause interval and repeats the same procedure until the difference between the measured and set point temperatures is reduced to one degree. Under such conditions, in the increment sub-routine, the determination of whether or not $T_{IN}$=Setpoint−2 (heating) or $T_{IN=Setpoint}+2$ (cooling) is negative. If, as assumed herein, the preliminary transition flag was set during a prior increment sub-routine (i.e., before the difference between the measured and set point temperatures was returned to one degree), that flag is then reset, the cycle transition flag is set, and the system returns to the cycle mode using the new on-time/pause interval. This time around, however, in the on-time interval (FIG. 11) the cycle transition flag is detected as having been set so that the Cycle Transition Accumulator parameter begins to accumulate the total on-time interval time required to move the measured temperature the additional degree to reach the set point (in the manner described above). Thus, the alternative paths at the bottom of the sub-routine flowchart (FIG. 13) serve to prevent accumulation of the on-time interval time until the temperature has moved from two degrees to one degree away from set point. This relates to the thermal inertia feature described above (in relation to FIG. 11) whereby the Cycle Transition Accumulator parameter, used in the cost savings computation, reflects the degree transition time during cycling only after the cycle mode has built up some inertia in driving the temperature back toward the set point.

The system as described above operates on the basis that the relationship between the measured temperature in the conditioned space and the set point or desired temperature is examined during every cycle (during alternate cycles for forced air heating) and modifications to the on-time or pause interval are made, if necessary. The individual cycles, each comprising a on-time interval and a pause interval, are not constrained to a fixed time period; rather, the total time for each cycle is entirely dependent upon existing temperature conditions. In addition, the system seeks to effect the smallest on-time interval, namely the minimum on-time, to the extent that temperature conditions permit. In this manner, fuel consumption is greatly minimized. The cycling approach of the present invention results in cycle times which are considerably shorter than those employed in most prior art cycling systems. It is basic to the present system that frequent cycles be employed because temperature stability, precisely at the set point, is more readily attained when cycling is frequent. Infrequent cycles cause longer on-time intervals which cause larger fluctuations in the conditioned space temperature and also result in greater fuel consumption.

Cycling, performed in accordance with the principle of the present invention, results in very significant cost savings as compared to prior art systems which maintain the temperature within a three degree dead zone range. As noted above, it is a feature of the present invention to provide a calculation of the cost savings based on a comparison of how long it takes to move the temperature in the conditioned space by one degree using the continuous on-time mode on the one hand and using cycling on the other hand. The cost savings, in the form of a percentage, may be displayed, either on command or automatically with each computation, at the display unit 11. At least once every five hours (and this five hour period may be longer or shorter, as desired), the conditioned space is permitted to drift two degrees from set point so that a continuous on-time may be initiated and an updated Continuous On-Time Single Degree Transition Time may be established. This assures that the Continuous On-Time Single Degree Transition Time remains valid as the temperature conditions in the controlled environment change. The equivalent parameter for cycling operation, namely the Cycle Transition Accumulator parameter, is updated in conjunction with the increment sub-routine as described above.

There are two important advantages obtained by virtue of maintaining the temperature in the conditioned space precisely at set point. First, fuel consumption and cost are reduced since it is not required to drive the temperature across a three degree dead zone during each on-time interval. Rather, each relatively short on-time interval is too short to drive the temperature in the conditioned space to any significant extent. Second, we have found that a stable temperature is more comfortable for occupants of the conditioned space than is a temperature which oscillates between dead zone limits. More specifically, and by way of example, occupants are more comfortable when the temperature is a steady sixty-five degrees than when the temperature continuously moves back and forth between sixty-eight and seventy-one degrees. As a consequence, fuel consumption and cost are reduced further by the ability to lower the setpoint without sacrificing comfort.

As indicated above, one reason for the greater efficiency (i.e., cost saving) achieved in cycling is that the cycling operation of the present invention takes advantage of the thermal inertia of the heating and/or cooling system whereas ordinary dead zone control thermostat operation does not. The cost saving is even more dramatic for boiler type heaters. More particularly, the energy required to attain the desired water temperature in the boiler is quite significant. Under conventional thermostat control, the thermal inertia of such a system is lost by letting the temperature of the water fall until such time as there is a drop in air temperature in the conditioned space. Each time there is a heat demand from a conventional thermostat, the inertia involved in re-heating the boiler system water must be re-established, thereby requiring large amounts of energy. The cycling operation of the present invention, on the other hand, does not wait for a heat demand from the conditioned space; rather, the system is cycled on and off without permitting the water in the system to cool appreciably. This same principle of thermal inertia is present in the forced air heating/cooling systems, although the energy required to heat or cool the air is considerably less than that required to heat the water in a boiler system. Thus, while the present invention results in cost savings on the order of twenty to forty percent, the cost saving resulting from the present invention used with a boiler-type heater has been in excess of one hundred percent of that.

A unique aspect of the cycling operation of the present invention is the reliance upon cycling to maintain, rather than attain, the established setpoint. Large differences between the measured temperature and the setpoint are overcome by means of the continuous on-time mode which is used to attain the set point; but cycling is the preferred mode of operation once set point has been attained and is only shunned as a last resort when the difference between the setpoint and the measured temperature is three degrees or more, or when temperature is so stable as to remain at setpoint without any need for heating/cooling, or to establish a new value for the Continuous On-Time Single Degree Transition Time parameter.

Another unique aspect of the cycling operation of the present invention is that the on-time/pause intervals are continuously automatically adjusted on the basis of three different considerations, namely: (1) the measured temperature; (2) the recent history of the system; and (3) the established minimum on-time. The measured temperature, of course, is $T_{IN}$ and is continuously monitored as part of the cycle routine (FIG. 11) to determine whether an increment or decrement routine should be entered. The past history of the system is reflected by the fact that, during the increment and decrement routines, changes to the on-time/pause intervals are a fixed percentage (i.e., ten percent) of the prior interval rather than setting the interval to some arbitrary value related to the measured temperature by a pre-established table. The minimum on-time is the preferred on-time interval which is sought by the system to the extent that temperature conditions permit.

In addition to the foregoing considerations of cycling which are effective for heating or cooling, air conditioner cycling according to the present invention uniquely accommodates competing considerations unique to air conditioner compressors. As noted above, the minimum pause during air conditioner cycling must be long enough to permit refrigerant liquid that has drained into the compressor to vaporize before the compressor is restarted. In addition the efficiency of the compressor is enhanced if the refrigerant is prevented from returning to ambient temperature but instead remains as cool as possible between on-times. The maximum pause, therefore, is chosen so that the fluid remains relatively cold so that it can be quickly converted to liquid once the compressor is turned back on.

The preferred embodiment of the present invention, as disclosed herein, takes the form of a general purpose microprocessor operating under the control of unique software to achieve the state objectives. It is to be understood, of course, that the invention also encompasses within its scope embodiments comprised of special purpose analog and/or digital hardware alone as well as such special purpose hardware used in combination with appropriate software. Moreover, it will be understood that the system operates at pre-stipulated times to effect certain changed conditions, such as setpoint temperature change. It will be appreciated that the system may likewise be programmed to effect conditions external to the thermostat and unconnected to the temperature-modifying apparatus, such as activation of burglary alarm systems, lights, appliances, etc. Likewise, a central computer, used for a multitude of household or office functions, can be programmed to effect the thermostat control functions described herein. For the latter type installation, where communication capability wiring is present, set point information and selected data may be supplied from a control computer to the unit of the present invention.

As noted above, the thermostat control system disclosed herein is applicable to both heating and cooling apparatus. Thus, the term on-time applies to the on state of either type apparatus and represents the time when fuel (i.e., fossil or non-fossil fuel, electrical energy, etc.) is being consumed by that apparatus. The off state, on the other hand, involves a fuel non-consumption mode wherein the apparatus may have a fan that remains on but does not consume fuel for purposes of changing the temperature in the conditioned space. Since heating apparatus tends to increase the temperature in response to ambient conditions in the conditioned space, while cooling apparatus tends to decrease such temperature, the term "sense" may be used to generically designate temperature change polarity so as to be applicable to either type apparatus. Thus, the heating/cooling apparatus tends to change the temperature in a first sense which is opposite to a change in a second sense caused by the ambient conditions.

From the foregoing description it will be appreciated that the invention makes available a novel electronic thermostat for controlling forced air heating/cooling systems, boiler-type heating systems, and other types of heating and/or cooling systems in a manner which results in greater fuel efficiency than has been heretofore been possible. In addition, the invention makes available a novel method for controlling such heating/cooling systems in a more efficient manner. The invention also makes available a cycling technique which optimizes the efficiency of the heating/cooling system while maintaining the temperature in the conditioned space precisely at the setpoint rather than effecting swings in that temperature between limits of a dead zone. The system attempts to maintain the on-time interval of each cycle at the minimum permissible on-time interval, to the extent that temperature conditions permit. The system also calculates Degree Transition Time for both the continuous on-time mode and the cycling mode in order to provide an indication of cost savings effected by the cycling mode; the Degree Transition Time computed during a continuous on-time mode is employed to establish the initial pause interval for the next cycling mode. Finally, the invention, makes available a unique method for permitting a homeowner or other user of the electronic thermostat to properly install the thermostat without fear of improper electrical connections.

Having described preferred embodiments of a new and improved electronic thermostat employing adaptive cycling, and method for operating such electronic thermostat, in accordance with the present invention, it is believed that other modifications, variations and changes will be suggested to those skilled in the art in view of the teachings set forth herein. It is therefore to be understood that all such variations, modifications, and changes are believed to fall within the scope of the present invention as defined by the appended claims.

What is claimed is:

1. An electronic thermostat system for controlling the operation of a temperature-modifying apparatus arranged to modify the temperature of a conditioned space, said apparatus having an on state in which it consumes fuel and an off state in which it does not consume fuel, said thermostat comprising:
   set point storage means for storing an operative set point temperature representing the desired temperature in said conditioned space;
   measurement means for measuring the temperature in said conditioned space and providing a measured temperature signal representing the measured temperature;
   cycle means for establishing a cycle mode of operation for said system in which said apparatus alternates between a variable on-time interval (in which said apparatus is in said on state) and a variable pause interval (in which said apparatus in in said off state), wherein the total time of the on-time and pause intervals is variable during different cycles;
   means for establishing a minimum on-time interval for said cycle mode; and
   cycle modification means responsive to said measured temperature signal, said set point temperature, said minimum on-time interval and the most recent values of said on-time and pause intervals for modifying the on-time and pause intervals to maintain the temperature in said conditioned space substantially at the set point temperature.

2. The system according to claim 1 wherein said measured temperature signal varies in predetermined minimum temperature increments, and wherein said cycle modification means includes means for maintaining said measured temperature within one minimum predetermined temperature increment of said set point temperature by modifying said on-time and pause intervals.

3. The system according to claim 2 further comprising:
   means for establishing a temperature increment transition time for said apparatus corresponding to the time required for said apparatus (in said on state) to change the temperature in said space by said minimum predetermined temperature increment; and
   initial interval determining means responsive to entry of said system into said cycle mode for establishing an initial value of said on-time interval which is significantly less than said temperature increment transition time.

4. The system according to claim 2 wherein said minimum on-time interval is determined by operating characteristics of said apparatus, and further comprising initial interval determining means for establishing said minimum on-time interval as an initial value of said on-time interval.

5. The system according to claim 4 wherein said initial interval determining means further comprises means for establishing an initial pause interval value as an inverse function of said temperature increment transition time.

6. The system according to claim 5 wherein said apparatus (in its on state) tends to change the measured temperature in said conditioned space in a first sense to oppose temperature conditions in said conditioned space which tend to change the measured temperature therein in a second sense opposite said first sense, said system further comprising:

means for establishing a minimum pause interval for said cycle mode;

means operative in said cycle mode, and responsive to at least a predetermined difference between said measured temperature and said set point temperature in said second sense, for calculating a decremented pause interval value as a function of the existing pause interval;

means for comparing the calculated decremented pause interval value to the minimum pause interval;

pause interval establishing means, responsive to the decremented pause interval value being at least as long as the minimum pause interval, for establishing the decremented pause interval value as the pause interval, said pause interval establishing means being further responsive to the decremented pause interval value being shorter than the minimum pause interval for establishing the minimum pause interval as the pause interval; and on-time interval incrementing means, responsive to the decremented pause interval value being shorter than minimum pause interval, for calculating an incremented on-time interval value as a function of the existing on-time interval, and for establishing said incremented on-time interval value as the on-time interval;

whereby the on-time interval is only incremented in response to an attempt to decrement the pause interval below the minimum pause interval.

7. The system according to claim 6 further comprising:

means operative in said cycle mode, and responsive to at least a predetermined difference between said measured temperature and said set point temperature in said first sense, for calculating a decremented on-time interval value as a function of the existing on-time interval;

means for comparing the decremented on-time interval to the minimum on-time interval;

on-time interval establishing means, responsive to the decremented on-time interval value being at least as long as the minimum on-time interval, for establishing the decremented on-time interval value as the on-time interval, and responsive to the decremented on-time interval value being shorter than the minimum on-time interval for establishing the minimum on-time interval as the on-time interval; and pause interval incrementing means, responsive to the decremented on-time interval value being shorter than the minimum on-time interval, for calculating an incremented pause interval value as a function of the existing pause interval, and for establishing said incremented pause interval value as the pause interval;

whereby the pause interval is only incremented in response to a corresponding attempt to decrement the burn interval below the minimum burn interval.

8. The system according to claim 7 further comprising:

means operative in said cycle mode for counting the number of attempts made in each cycle mode to decrement the on-time interval below said minimum on-time interval; and means responsive to the total of said attempts count becoming greater than a predetermined count value for terminating the cycle mode.

9. The system according to claim 8 further comprising:

means operative in said cycle mode for counting the number of cycles occurring in each cycle mode;

means responsive to the occurrence of a predetermined number of successive cycles without change in said on-time and pause intervals for calculating a decremented on-time interval value as a function of the existing on-time interval;

on-time interval establishing means, responsive to the decremented on-time interval value being at least as long as the minimum on-time interval, for establishing the decremented on-time interval value as the on-time interval, and responsive to the decremented on-time interval value being shorter than the minimum on-time interval, for establishing the minimum on-time interval as the on-time interval; and pause interval incrementing means, responsive to the decremented on-time interval value being shorter than the minimum on-time interval, for calculating an incremented pause interval value as a function of the existing pause interval, and for establishing said incremented pause interval value as the pause interval;

whereby the pause interval is only incremented in response to a corresponding attempt to decrement the on-time interval below the minimum on-time interval.

10. The system according to claim 7 further comprising:

continuous on-time means for initiating a continuous on-time mode of operation for said system in response to a predetermined difference (in said second sense) between said measured and set point temperatures, said continuous on-time mode being characterized by said apparatus being maintained continuously in said on state, wherein said predetermined difference is equal to a plurality of said minimum temperature increments;

means operative in said continuous on-time mode, and responsive to said measured temperature becoming equal to the set point temperature, for initiating said cycle mode.

11. The system according to claim 10 further comprising:

temperature transient compensation means, operative in said cycle mode and responsive to the difference between the measured and set point temperatures being at least a pre-established value (in said second sense) at the end of each of plural successive cycles, for transferring the system out of said cycle mode;

wherein said pre-established value is greater than said predetermined minimum temperature increment and less than said predetermined difference between said measured and set point temperatures.

12. The system according to claim 10 further comprising:

means operative in said cycle mode, and responsive to the difference between the measured and set point temperatures being at least a pre-established value in said second sense, for transferring the system out of said cycle mode;

wherein said pre-established value is greater than said predetermined minimum temperature increment and less than said predetermined difference between said measured and set point temperatures.

13. The system according to claim 5 wherein said apparatus is a forced air heating apparatus in which a fan blows air (during the on state) over a heat exchanger to heat the air, and then delivers the heated air into the conditioned space, said system further comprising:

fan control means operative during each pause interval for maintaining said fan on for the initial portion of that pause interval, said initial portion being a predetermined fraction of the on-time interval, said fan control means including means for turning said fan off after the initial portion of said pause interval.

14. The system according to claim 1 wherein said minimum on-time interval is determined by operating characteristics of said apparatus, said system further comprising:

means responsive to initiation of a cycle mode for establishing an initial value of said on-time interval equal to said minimum on-time interval.

15. The system according to claim 14 further comprising:

means for establishing a temperature increment transition time for said apparatus corresponding to the time required for said apparatus, (in said on state), to change the temperature in said space by a minimum predetermined temperature increment; and initial pause interval determining means, responsive to initiation of a cycle mode, for establishing an initial pause interval value as an inverse function of said temperature increment transition time.

16. The system according to claim 14 further comprising:

means for establishing a minimum pause interval for said cycle mode;

means for establishing an initial pause interval value as a direct function of said minimum on-time interval and said minimum pause interval.

17. The system according to claim 1 wherein said apparatus (in its on state) tends to change the measured temperature in said conditioned space in a first sense to oppose temperature conditions in said conditioned space which tend to change the measured temperature therein in a second sense opposite said first sense, said system further comprising:

means for establishing a minimum pause interval for said cycle mode;

means operative in said cycle mode, and responsive to at least a predetermined difference between said measured temperature and said set point temperature in said second sense, for calculating a decremented pause interval value as a function of the existing pause interval;

means for comparing the decremented pause interval value to the minimum pause interval;

pause interval establishing means, responsive to the decremented pause interval value being at least as long as the minimum pause interval, for establishing the decremented pause interval value as the pause interval, said pause interval establishing means being further responsive to the decremented pause interval value being shorter than the minimum pause interval for establishing the minimum pause interval as the pause interval; and on-time interval incrementing means, responsive to the decremented pause interval value being shorter than minimum pause interval, for calculating an incremented on-time interval value as a preset function of the existing on-time interval, and for establishing said incremented longer on-time interval value as the on-time interval;

whereby the on-time interval is only incremented in response to an attempt to decrement the pause interval below the minimum pause interval.

18. The system according to claim 17 further comprising:

means operative in said cycle mode, and responsive to at least a predetermined difference between said measured temperature and said set point temperature in said first sense, for calculating a decremented on-time interval value as a preselected function of the existing on-time interval;

means for comparing the decremented on-time interval to the minimum on-time interval;

on-time interval establishing means, responsive to the decremented on-time interval value being greater than or equal to the minimum on-time interval, for establishing the decremented on-time interval value as the on-time interval, and responsive to the decremented on-time interval value being shorter than the minimum on-time interval for establishing the minimum on-time interval as the on-time interval; and pause interval incrementing means, responsive to the decremented on-time interval value being shorter than the minimum on-time interval, for calculating an incremented pause interval value as a preset function of the existing pause interval, and for establishing said incremented pause interval value as the pause interval;

whereby the pause interval is only incremented in response to a corresponding attempt to decrement the on-time interval below the minimum on-time interval.

19. The system according to claim 18 further comprising:

means operative in said cycle mode for counting the number of attempts made in each cycle mode to decrement the on-time interval below said minimum on-time interval; and means responsive to the total of said attempts count becoming greater than a predetermined count value for terminating the cycle mode.

20. The system according to claim 19 further comprising:

means operative in said cycle mode for counting the number of cycles occurring in each cycle mode;

means response to the occurrence of a predetermined number of successive cycles without change in said on-time and pause intervals for calculating a decremented on-time interval value as a function of the existing on-time interval;

on-time interval establishing means, responsive to the decremented on-time interval value being greater than or equal to the minimum on-time interval, for establishing the decremented on-time interval value as the on-time interval, and responsive to the decremented on-time interval value being shorter than the minimum on-time interval for establishing the minimum on-time interval as the on-time interval; and pause interval incrementing means, responsive to the decremented on-time interval value being shorter than the minimum on-time interval, for calculating an incremented pause interval value as a preset function of the existing pause interval, and for establishing said incremented pause interval value as the pause interval;

whereby the pause interval is only incremented in response to a corresponding attempt to decrement the on-time interval below the minimum on-time interval.

21. The system according to claim 1 wherein said apparatus, in its on state, tends to change the measured temperature in said conditioned space in a first sense to oppose temperature conditions in said conditioned space that tend to change the measured temperature in a second sense opposite said first sense, said system further comprising:

means operative in said cycle mode, and responsive to variation of said measured temperature from the set point temperature by a predetermined amount in said first sense, for calculating a decremented on-time interval value as a preselected function of the existing on-time interval;

means for comparing the decremented on-time interval to the minimum on-time interval;

on-time interval establishing means, responsive to the decremented on-time interval value being at least as great as the minimum on-time interval, for establishing the decremented on-time interval value as the on-time interval, and responsive to the decremented on-time interval value being shorter than the minimum on-time interval for establishing the minimum burn interval as the on-time interval; and pause interval incrementing means, responsive to the decremented on-time interval value being shorter than the minimum burn interval, for calculating an incremented pause interval value as a preset function of the existing pause interval, and for establishing said incremented pause interval value as the pause interval;

whereby the pause interval is only incremented in response to a corresponding attempt to decrement the on-time interval below the minimum on-time interval.

22. The system according to claim 21 further comprising:

means operative in said cycle mode for counting the number of attempts made in each cycle mode to decrement the on-time interval below said minimum on-time interval; and means responsive to the total of said attempts count becoming greater than a predetermined count value for terminating the cycle mode.

23. The system according to claim 1 wherein said apparatus, in its on state, tends to change the measured temperature in said space in a first sense to oppose temperature conditions in said space that tend to change the measured temperature in a second sense opposite said first sense, wherein said measured temperature signal varies in predetermined minimum temperature increments, said system further comprising:

continuous on-time means for initiating a continuous on-time mode of operation for said system in response to a predetermined difference, in said second sense, between said measured and set point temperatures, said continuous on-time mode being characterized by said apparatus being maintained continuously in said on state, wherein said predetermined difference is equal to a plurality of said minimum temperature increments;

means operative in said continuous on-time mode, and responsive to said measured temperature becoming equal to the set point temperature, for initiating said cycle mode.

24. The system according to claim 1 further comprising:

means operative in said cycle mode, and responsive to the difference between the measured and set point temperatures becoming a pre-established value in said second sense, for transferring the system out of said cycle mode;

wherein said pre-established value is greater than said predetermined minimum temperature increment and less than said predetermined difference between set measured and set point temperatures.

25. The system according to claim 1 wherein said apparatus, in its on state, tends to change the measured temperature in said space in a first sense to oppose conditions in said space that tend to change the measured temperature in a second and opposite sense, and further comprising:

temperature transient compensation means, operative in said cycle mode and responsive to the difference between the measured and set point temperatures becoming a pre-established value (in said second sense) at the end of each of plural successive cycles, for transferring the system out of said cycle mode;

wherein said pre-established value is greater than said predetermined minimum temperature increment and less than said predetermined difference between said measured and set point temperatures.

26. The system according to claim 1 wherein said apparatus is a forced air heating apparatus in which a fan blows air during the on state over a heat exchanger to heat the air and then delivers the heated air into the conditioned space, said system further comprising:

fan control means operative during each pause interval for maintaining said fan on for the initial portion of that pause interval, said initial portion being a predetermined fraction of the on-time interval, said fan control means including means for turning said fan off after the initial portion of said pause interval.

27. The system according to claim 1 wherein said apparatus is a forced air type temperature modifying unit.

28. The system according to claim 1 wherein said apparatus is a boiler-type heater unit wherein heated liquid is circulated through flow conduits in the conditioned space to permit thermal transfer from the liquid through the flow conduits to air in the conditioned space.

29. The system according to claim 1 further comprising:

means for periodically establishing a temperature increment transition time for said apparatus corresponding to the time required for said apparatus, in said on state, to change the temperature in said space by a minimum predetermined temperature increment;

means for periodically determining the accumulated on-time interval time, in the cycle mode, required to change the temperature in said space by said minimum predetermined increment; and means for periodically computing the cost saving resulting from operating in the cycle mode by comparing said temperature increment transition time to said accumulated on-time interval time.

30. The system according to claim 1 wherein said temperature modifying apparatus is of a type which must be in its on state for a minimum period of time before reaching substantially optimum efficiency in modifying the temperature in the conditioned space, wherein said minimum on-time interval is at least as long as said minimum period of time, and wherein said cycle modification means includes means for preventing said on-time interval from becoming shorter than said minimum on-time interval.

31. The system according to claim 30 further comprising means for establishing a minimum pause interval for said cycle mode, wherein said cycle modification means includes means for preventing said pause interval from becoming shorter than said minimum pause interval.

32. The system according to claim 31 wherein said apparatus is a forced air heater in which heat is generated during the on state to heat a thermal exchange surface over which air is directed before being delivered into said conditioned space, wherein said minimum on-time interval corresponds to the apparatus on time required to heat said thermal exchange surface sufficiently so that further apparatus on time does not significantly increase the temperature of said thermal exchange surface, and wherein said minimum pause interval is sufficiently long to enable most of the useful thermal energy stored at said thermal exchange surface during the immediately previous on-time interval to be transferred to the air directed over the thermal exchange surface but sufficiently short to prevent complete cooling of said thermal exchange surface to ambient temperature between burn intervals, said system further comprising means for maintaining air flow over said thermal exchange surface for at least a portion of each pause interval.

33. The system according to claim 32 wherein said portion of each pause interval is a predetermined fraction of the current on-time.

34. The system according to claim 31 wherein said apparatus is a boiler-type heater in which liquid is heated during the on state and caused to flow through pipes at least partially located in said conditioned space to heat air in that space, wherein said minimum on-time interval corresponds to the time required to heat said liquid to substantially its maximum temperature, and wherein said minimum pause interval is sufficiently long to enable most of the useful thermal energy stored in said liquid during the immediately preceding on-time interval to be transferred to the air in said conditioned space, but sufficiently short to prevent said liquid to be cooled to the ambient temperature in said conditioned space between on-time intervals.

35. The system according to claim 31 wherein said apparatus is an air conditioner in which a refrigerant fluid is compressed to a liquid state during the apparatus on state to cool a thermal exchange surface, the refrigerant fluid tending to return to a gaseous state during the off state, wherein said minimum pause interval is sufficiently long to permit vaporization of the refrigerant fluid between on-time intervals, wherein said minimum on-time interval is sufficiently long to ensure that relatively cool refrigerant fluid in its vapor state can be compressed to its liquid state, said system further comprising means for establishing a maximum pause interval for said cycle mode, wherein said cycle modification means includes means for preventing said pause interval from becoming longer than said maximum pause interval, and wherein said maximum pause interval is sufficiently short to prevent the vaporized refrigerant fluid from warming significantly beyond the temperature necessary to achieve vaporization.

36. The system according to claim 1 wherein said system includes a programmable computer and further comprising:

data entry means for permitting manual entry of selected time information into said computer;

real time clock means for measuring time; and means responsive to the time, as measured by said real time clock means, becoming equal to a manually selected and entered time for establishing a changed condition in said system.

37. The claim according to claim 36 wherein said changed condition is said set point temperature.

38. The system according to claim 1 further comprising means for permitting manual entry of new set point temperature information to override the set point temperature stored in said set point temperature storage means.

39. The system according to claim 1 further comprising:

data entry means for permitting manual entry of a plurality of selected temperature set points into said system along with time information identifying times when said temperature set points shall be effective;

real time clock means for measuring time; and means responsive to said real time clock means for automatically employing each of the entered set points as the operative set point in said system at the indicated effective time for that entered set point.

40. The system according to claim 1 further comprising:

data entry means;

a plurality of wires for electrically connecting said apparatus to said system; and user-interactive means for providing a plurality of sequentially displayed prompts in the English language to instruct a user to follow respective steps in connecting said plurality of wires to said system, said prompts including instructions to the user to enter coded indicia via said data entry means to indicate system response to wire connections made by the user in response to certain of said prompts.

41. An electronic thermostat system for controlling the operation of a temperature modifying apparatus arranged to modify the temperature, in a first sense, of a conditioned space, said apparatus having an on state in which the apparatus consumes fuel and an off state in which the apparatus does not consume fuel, said thermostat comprising:

set point means for storing an operative set point temperature representing the desired temperature in said conditioned space;

measurement means for measuring the temperature in said conditioned space and providing a measured temperature signal representing the measured temperature;

cycle means for establishing a cycle mode of operation for said system in which said apparatus alternates between a variable on-time interval (in which said apparatus is in said on state) and a variable pause interval (in which said apparatus is in said off state);

means for establishing a minimum on-time interval for said cycle mode, said minimum on-time interval corresponding to the on state time of said apparatus required to achieve substantially optimum efficiency in terms of maximum temperature modification in said conditioned space for a specified fuel consumption;

means for establishing a minimum pause interval for said cycle mode, said minimum pause interval corresponding to sufficient time in the off state to permit said apparatus to dissipate substantially all of the useful residual thermal energy remaining stored in said apparatus after an immediately preceding on-time interval;

cycle modification means responsive to temperature conditions in said conditioned space for maintaining the measured temperature substantially at said set point temperature, said cycle modification means including:

means responsive to differences between said measured temperature and said set point temperature in a second sense, opposite said first sense, for maintaining said on-time interval at said minimum on-time interval while decrementing said pause interval in successive cycles until the measured temperature returns substantially to said set point temperature or until said pause interval becomes equal to said minimum pause interval, which ever occurs first; and means responsive to (a) the pause interval being equal to the minimum pause interval, (b) the on-time interval being equal to the minimum on-time interval, and (c) a difference between said measured temperature and said set point temperature in said second sense, for incrementing said on-time interval to reduce said difference;

whereby the minimum on-time interval is the preferred on-time interval for said system and is maintained in spite of temperature modification requirements in said conditioned space unless the pause interval is equal to the minimum pause interval.

42. The system according to claim 41 wherein each cycle, consisting of a on-time interval and a pause interval, has a variable total time interval.

43. The system according to claim 41 wherein said cycle modification means includes means for permitting modification of said on-time interval and said pause interval only as specified increments and decrements of the existing on-time and pause intervals, respectively.

44. The system according to claim 41 wherein said measured temperature signal varies in predetermined minimum temperature increments, wherein said cycle modification means includes means for maintaining said measured temperature within one minimum predetermined temperature increment of said set point temperature by modifying said on-time and pause intervals.

45. The system according to claim 44 further comprising:

means for establishing a temperature increment transition time for said apparatus corresponding to the time required for said apparatus in said on state to change the temperature in said space by said minimum predetermined temperature increment; and initial interval determining means responsive to entry of said system into said cycle mode for establishing an initial value of said on-time interval which is significantly less than said temperature increment transition time.

46. The system according to claim 45 wherein said minimum burn interval is determined by operating characteristics of said apparatus, and wherein said initial interval determining means includes means for establishing said minimum on-time interval as said initial value of said on-time interval.

47. The system according to claim 46 wherein said initial interval determining means further comprises means for establishing an initial pause interval value as an inverse function of said temperature increment transition time.

48. The system according to claim 41 further comprising means operative in said cycle mode, and reponsive to differences between said measured temperature and said set point temperature in said first sense, for calculating a decremented on-time interval value as a function of the existing on-time interval;

means for comparing the decremented on-time interval value to the minimum on-time interval;

on-time interval establishing means responsive to the decremented on-time interval value being greater than or equal to the minimum on-time interval for establishing the decremented on-time interval value as the on-time interval, and responsive to the decremented on-time interval value being shorter than the minimum on-time interval for establishing the minimum on-time interval as the on-time interval; and pause interval incrementing means responsive to the decremented on-time interval value being shorter than the minimum on-time interval for calculating an incremented pause interval value as a preselected function of the existing pause interval, and for establishing said incremented pause interval value as the pause interval;

whereby the pause interval is only incremented in response to a corresponding attempt to decrement the on-time interval below the minimum on-time interval.

49. The system according to claim 48 further comprising:

means operative in said cycle mode for counting the number of attempts made in each cycle mode to decrement the on-time interval below said minimum on-time interval; and means responsive to the total of said attempts count becoming greater than a predetermined count value for terminating the cycle mode.

50. The system according to claim 48 further comprising:

means operative in said cycle mode for counting the number of cycles occurring in each cycle mode;

means response to the occurrence of a predetermined number of successive cycles without change in said on-time and pause intervals for calculating a decremented on-time interval value as a preselected function of the existing on-time interval;

on-time interval establishing means, responsive to the decremented on-time interval value being greater than or equal to the minimum on-time interval, for establishing the decremented on-time interval value as the on-time interval, and responsive to the decremented on-time interval value being shorter than the minimum on-time interval for establishing the minimum on-time interval as the on-time interval; and pause interval incrementing means, responsive to the decremented on-time interval value being shorter than the minimum on-time interval, for calculating an incremented pause interval value as a preset function of the existing pause interval, and for establishing said incremented pause interval value as the pause interval;

whereby the pause interval is only incremented in response to a corresponding attempt to decrement the on-time interval below the minimum on-time interval.

51. The system according to claim 41 wherein said apparatus, in its on state, tends to change the measured temperature in said space in said first sense to oppose temperature conditions in said space that tend to change the measured temperature in a second sense opposite said first sense, wherein said measured temperature signal varies in predetermined minimum temperature increments, said system further comprising:

continuous on-time means for initiating a continuous on-time mode of operation for said system in response to a predetermined difference, in said second sense, between said measured and set point temperatures, said continuous on-time mode being characterized by said apparatus being maintained continuously in said on state, wherein said predetermined difference is equal to a plurality of said minimum temperature increments;

means operative in said continuous on-time mode, and responsive to said measured temperature becoming equal to the set point temperature, for initiating said cycle mode.

52. The system according to claim 41 further comprising:

means operative in said cycle mode, and responsive to the difference between the measured and set point temperatures becoming a pre-established value in said second sense, for transferring the system out of said cycle mode;

wherein said pre-established value is greater than said predetermined minimum temperature increment and less than said predetermined difference between set measured and set point temperatures.

53. The system according to claim 41 further comprising:

temperature transient compensation means, operative in said cycle mode and responsive to the difference between the measured and set point temperature becoming a pre-established value in said second sense at the end of plural successive cycles, for transferring the system out of said cycle mode;

wherein said pre-established value is greater than said predetermined minimum temperature increment and less than said predetermined difference between said measured and set point temperatures.

54. The system according to claim 41 wherein said apparatus is a forced air heating apparatus in which a fan blows air during the on state over a heat exchanger to heat the air and then delivers the heated air into the conditioned space, said system further comprising:

means operative during each pause interval for maintaining said fan on for the initial portion of that pause interval, said initial portion being a predetermined fraction of the on-time interval.

55. The system according to claim 44 wherein said apparatus is a boiler-type heater unit wherein heated liquid is circulated through flow conduits in the conditioned space to permit thermal transfer from the liquid to air in the conditioned space through the flow conduits.

56. The system according to claim 41 further comprising:

means for periodically establishing a temperature increment transition time for said apparatus corresponding to the time required for said apparatus, in said on state, to change the temperature in said space by a minimum predetermined temperature increment;

means for periodically determining the accumulated burn interval time, in the cycle mode, required to change the temperature in said space by said minimum predetermined increment; and means for periodically computing the cost saving resulting from operating in the cycle mode by comparing said temperature increment transition time to said accumulated on-time interval time.

57. The system according to claim 41 wherein said temperature modifying apparatus is of a type which must be in its on state for a minimum period of time before reaching substantially optimum efficiency in modifying the temperature in the conditioned space, wherein said minimum on-time interval is at least as long as said minimum period of time, and wherein said cycle modification means includes means for preventing said on-time interval from becoming shorter than said minimum on-time interval.

58. The system according to claim 57 further comprising means for establishing a minimum pause interval for said cycle mode, wherein said cycle modification means includes means for preventing said pause interval from becoming shorter than said minimum pause interval.

59. The system according to claim 57 wherein said apparatus is a forced air heater in which heat is generated during the on state to heat a thermal exchange surface over which air is directed before being delivered into said conditioned space, wherein said minimum on-time interval corresponds to the apparatus on time required to heat said thermal exchange surface sufficiently so that further apparatus on time does not significantly increase the temperature of said thermal exchange surface, and wherein said minimum pause interval is sufficiently long to enable most of the useful thermal energy stored in said thermal exchange surface during the immediately previous on-time interval to be transferred to the air directed over the thermal exchange surface but sufficiently short to prevent complete cooling of said thermal exchange surface to ambient temperature between on-time intervals, said system further comprising means for maintaining air flow over said thermal exchange surface for at least a portion of each pause interval.

60. The system according to claim 59 wherein said portion of each pause interval is a predetermined fraction of the current on-time interval.

61. The system according to claim 57 wherein said apparatus is a boiler-type heater in which liquid is heated during the on state and caused to flow through pipes at least partially located in said conditioned space to heat air in that space, wherein said minimum on-time interval corresponds to the time required to heat said liquid to its maximum temperature, and wherein said minimum pause interval is sufficiently long to enable most of the useful thermal energy stored in said liquid during the immediately preceding on-time interval to be transferred to the air in said conditioned space, but sufficiently short to prevent said liquid to be cooled to the ambient temperature in said conditioned space between on-time intervals.

62. The system according to claim 57 wherein said apparatus is an air conditioner in which a refrigerant fluid is compressed to a liquid state during the apparatus on state to cool a thermal exchange surface, the refrigerant fluid tending to return to a gaseous state during the off state, wherein said minimum pause interval is sufficiently long to permit vaporization of the refrigerant fluid between on-time intervals, wherein said minimum on-time interval is sufficiently long to ensure that relatively cool refrigerant fluid in its vapor state can be compressed to its liquid state, said system further comprising means for establishing a maximum pause interval for said cycle mode, wherein said cycle modification means includes means for preventing said pause interval from becoming longer than said maximum pause interval, and wherein said maximum pause interval is sufficiently short to prevent the vaporized refrigerant fluid from warming significantly beyond the temperature necessary to achieve vaporization.

63. The system according to claim 41 further comprising:
data entry means for permitting manual entry of selected time information into said system;
real time clock means for measuring time; and
means responsive to the time, as measured by said real time clock means, becoming equal to a manually selected and entered time for establishing a changed condition in said system.

64. The claim according to claim 63 wherein said changed condition is said set point temperature.

65. The system according to claim 41 further comprising means for permitting manual entry of new set point temperature information to override the set point temperature stored in said set point temperature storage means.

66. The system according to claim 41 further comprising:
data entry means for permitting manual entry of a plurality of selected temperature set points into said system along with time information identifying when said temperature set points shall be effective;
real time clock means for measuring time; and
means responsive to said real time clock means for automatically employing each of the entered set points as the operative set point in said system at the indicated effective time for that entered set point.

67. The system according to claim 41 further comprising:
data entry means;
a plurality of wires for electrically connecting said apparatus to said system; and
user-interactive means for providing a plurality of sequentially displayed prompts in the English language to instruct a user to follow respective steps in connecting said plurality of wires to said system, said prompts including instructions to the user to enter coded indicia via said data entry means to indicate system response to wire connections made by the user in response to certain of said prompts.

68. A method for controlling the operation of a temperature-modifying apparatus arranged to modify the temperature of a conditioned space, said apparatus having an on state in which it consumes fuel and an off state in which it does not consume fuel, said method comprising the steps of:
(a) storing a set point temperature representing the desired temperature in said conditioned space;
(b) measuring the temperature in said conditioned space and providing a measured temperature signal representing the measured temperature;
(c) establishing a cycle mode of operation in which said apparatus alternates between a variable on-time interval (in which said apparatus is in said on state) and a variable pause interval (in which said apparatus is in said off state), wherein the total time of the on-time and pause intervals is variable from cycle to cycle;
(d) establishing a minimum on-time interval for said cycle mode; and
(e) in response to said measured temperature signal, to said set point temperature, to said minimum on-time interval, and to the most recent values of said on-time and pause intervals, modifying the on-time and pause intervals to maintain the temperature in the conditioned space substantially at the set point temperature.

69. The method according to claim 68 wherein said measured temperature signal varies in predetermined minimum temperature increments, and wherein step (e) includes maintaining said measured temperature within one minimum predetermined temperature increment of said set point temperature by modifying said on-time and pause intervals.

70. The method according to claim 68 further comprising:
(f) establishing a temperature increment transition time for said apparatus corresponding to the time required for said apparatus (in said on state) to change the temperature in said space by a minimum predetermined temperature increment; and
(g) in response to entry of said system into said cycle mode, establishing an initial value of said on-time interval which is significantly less than said temperature increment transition time.

71. The method according to claim 68 wherein said minimum on-time interval is determined by operating characteristics of said apparatus, and further including the step of establishing said minimum on-time interval as said initial value of said burn interval.

72. The method according to claim 69 further comprising the step of:
(f) establishing a temperature increment transition time for said apparatus corresponding to the time required for said apparatus (in said on state) to change the temperature in said space by a minimum predetermined temperature increment; and
(g) establishing an initial pause interval value as an inverse function of said temperature increment transition time.

73. The method according to claim 72 further comprising:
establishing a minimum pause interval for said cycle mode;

wherein said initial pause interval value is established in step (g) as a direct function of said minimum on-time interval and said minimum pause interval.

74. The method according to claim 68 wherein said apparatus (in its on state) tends to change the measured temperature in said conditioned space in a first sense to oppose temperature conditions in said conditioned space which tend to change the measured temperature therein in a second sense opposite said first sense, said method further comprising:

establishing a minimum pause interval for said cycle mode;

in said cycle mode, and in response to at least a predetermined difference between said measured temperature and said set point temperature in said second sense, calculating a decremented pause interval value as a function of the existing pause interval;

comparing the decremented pause interval value to the minimum pause interval;

in response to the decremented pause interval being at least as long as the minimum pause interval, establishing the decremented pause interval value as the pause interval, and in response to the decremented pause interval being shorter than the minimum pause interval, establishing the minimum pause interval as the pause interval; and in response to the decremented pause interval being shorter than the minimum on-time interval, calculating an incremented on-time interval value as a preset function of the existing on-time burn interval, and establishing said incremented burn interval value as the burn interval;

whereby the burn interval is only incremented in response to an attempt to decrement the pause interval below the minimum pause interval.

75. The method according to claim 68 wherein said apparatus (in its on state) tends to change the measured temperature in said conditioned space in a first sense to oppose temperature conditions in said conditioned space which tend to change the measured temperature therein in a second sense opposite said first sense, said method further comprising:

in said cycle mode, and in response to at least a predetermined difference between said measured temperature and said set point temperature in said first sense, calculating a decremented on-time interval value as a preselected function of the existing on-time interval;

comparing the decremented on-time interval to the minimum on-time interval;

in response to the decremented on-time interval being at least as long as the minimum pause interval, establishing the decremented on-time interval as the on-time interval, and in response to the decremented on-time interval value being shorter than the minimum on-time interval, establishing the minimum on-time interval as the on-time interval; and in response to the decremented on-time interval value being shorter than the minimum on-time interval, calculating an incremented pause interval as a preset function of the existing pause interval, and establishing said incremented pause interval value as the pause interval;

whereby the pause interval is only incremented in response to a corresponding attempt to decrement the on-time interval below the minimum on-time interval.

76. The method according to claim 75 further comprising:

counting the number of attempts made in each cycle mode to decrement the on-time interval below said minimum on-time interval; and in response to said attempts count becoming greater than a predetermined count value, terminating the cycle mode.

77. The method according to claim 68 wherein said temperature modifying apparatus is of a type which must be in its on state for a minimum period of time before reaching substantially optimum efficiency in modifying the temperature in the conditioned space, wherein said minimum on-time interval is at least as long as said minimum period of time, and wherein step (e) includes preventing said on-time interval from becoming shorter than said minimum on-time interval.

78. The method according to claim 68 further comprising:

counting the number of cycles occurring in each cycle mode;

in response to the occurrence of a predetermined number of successive cycles without change in said on-time and pause intervals, calculating a decremented on-time interval value as a function of the existing on-time interval;

in response to the decremented on-time interval value being at least as long as the minimum on-time interval, establishing the decremented on-time interval value as the on-time interval;

in response to the decremented on-time interval value being shorter than the minimum on-time interval, establishing the minimum on-time interval as the on-time interval; and in response to the decremented on-time interval value being shorter than the minimum on-time interval, calculating an incremented pause interval as a function of the existing pause interval, and establishing said incremented pause interval value as the pause interval;

whereby the pause interval is only incremented in response to a corresponding attempt to decrement the on-time interval below the minimum on-time interval.

79. The method according to claim 68 wherein said apparatus, in its on state, tends to change the measured temperature in said space in a first sense to oppose temperature conditions in said space that tend to change the measured temperature in a second sense opposite said first sense, wherein said measured temperature signal varies in predetermined minimum temperature increments, said method further comprising:

initiating a continuous on-time mode of operation for said system in response to a predetermined difference, in said second sense, between said measured and set point temperatures, said continuous on-time mode being characterized by said apparatus being maintained continuously in said on state, wherein said predetermined difference is equal to a plurality of said minimum temperature increments; and in said continuous on-time mode, and in response to said measured temperature becoming equal to the set point temperature, initiating said cycle mode.

80. The method according to claim 68 wherein said apparatus (in its on state) tends to change the measured temperature in said conditioned space in a first sense to oppose temperature conditions in said conditioned space which tend to change the measured temperature therein in a second sense opposite said first sense, wherein said measured temperature signal varies in predetermined minimum temperature increments, said method further comprising:

in said cycle mode, and in response to the difference between the measured and set point temperatures becoming a pre-established value in said second sense, transferring the system out of said cycle mode;

wherein said pre-established value is greater than said predetermined minimum temperature increment and less than said predetermined difference between said measured and set point temperatures.

81. The method according to claim 68 wherein said apparatus, in its on state, tends to change the measured temperature in said conditioned space in a first sense to oppose temperature conditions in said conditioned space which tend to change the measured temperature therein in a second sense opposite said first sense, wherein said measured temperature signal varies in predetermined minimum temperature increments, said method further comprising:

in said cycle mode, and in response to the difference between the measured and set point temperatures becoming a pre-established value (in said second sense) at the end of plural successive cycles, transferring the system out of said cycle mode;

wherein said pre-established value is greater than said predetermined minimum temperature increment and less than said predetermined difference between said measured and set point temperatures.

82. The method according to claim 68 wherein said apparatus is a forced air heating apparatus in which a fan blows air, during the on state, over a heat exchanger to heat the air, and then delivers the heated air into the conditioned space, said method further comprising:

during each pause interval, maintaining said fan on only for the initial portion of that pause interval, said initial portion being a predetermined fraction of the on-time interval.

83. The method according to claim 68 further comprising:

periodically estabishing a temperature increment transition time for said apparatus corresponding to the time required for said apparatus (in its on state) to change the temperature in said space by a minimum predetermined temperature increment;

periodically determining the accumulated on-time interval time, in a cycle mode, required to change the temperature in said space by said minimum predetermined increment; and periodically computing the cost savings resulting from operating in the cycle mode by comparing said temperature increment transition time to said accumulated on-time interval time.

84. The method according to claim 68 wherein said apparatus is a forced air heater in which heat is generated during the on state to heat a thermal exchange surface over which air is directed before being delivered into said conditioned space, wherein said minimum on-time interval corresponds to the apparatus on time required to heat said thermal exchange surface sufficiently so that further apparatus on time does not significantly increase the temperature of said thermal exchange surface, and wherein said minimum pause interval is sufficiently long to enable most of the useful thermal energy stored at said thermal exchange surface during the immediately previous on-time interval to be transferred to the air directed over the thermal exchange surface, but sufficiently short to prevent complete cooling of said thermal exchange surface to ambient temperature between on-time intervals, said method further comprising the step of maintaining air flow over said thermal exchange surface for at least a portion of each pause interval.

85. The method according to claim 84 wherein said portion of each pause interval is a predetermined fraction of the current on-time interval.

86. The method according to claim 68 wherein said apparatus is a boiler-type heater in which liquid is heated during the on state and caused to flow through pipes at least partially located in said conditioned space to heat air in that space, wherein said minimum on-time interval corresponds to the time required to heat said liquid to substantially its maximum temperature, and wherein the minimum pause interval is sufficiently long to enable most of the useful thermal energy stored in said liquid during the immediately preceding on-time interval to be transferred to the air in said conditioned space, but sufficiently short to prevent said liquid to be cooled to the ambient temperature in said conditioned space between said on-time intervals.

87. The method according to claim 68 wherein said apparatus is an air conditioner in which a refrigerant fluid is compressed to a liquid state during the apparatus on state to cool a thermal exchange surface, the refrigerant fluid tending to return to a gaseous state during the off state, wherein said minimum pause interval is sufficiently long to permit vaporization of the refrigerant fluid between on-time intervals, wherein said minimum on-time interval is sufficiently long to ensure that relatively cool refrigerant fluid in its vapor state can be compressed to its liquid state, said method further comprising the step of establishing a maximum pause interval for said cycle mode, wherein said step (e) includes preventing said pause interval from becoming longer than said maximum pause interval, and wherein said maximum pause interval is sufficiently short to prevent the vaporized refrigerant fluid from warming significantly beyond the temperature necessary to achieve vaporization.

88. A method for controlling the operation of a temperature modifying apparatus arranged to modify the temperature (in a first sense) of a conditioned space, said apparatus having an on state in which the apparatus consumes fuel and an off state in which the apparatus does not consume fuel, said method comprising the steps of:

(a) storing a set point temperature representing the desired temperature in said conditioned space;

(b) measuring the temperature in said conditioned space and providing a measured temperature signal representing the measured temperature;

(c) establishing a cycle mode of operation in which said apparatus alternates between a variable on-time interval (in which said apparatus is in the on state) and a variable pause interval (in which said apparatus is in said off state);

(d) establishing a minimum on-time interval for said cycle mode, said minimum on-time interval corresponding to the on state time of said apparatus required to achieve substantially optimum efficiency in terms of maximum temperature modification in said conditioned space for a specified fuel consumption;

(e) establishing a minimum pause interval for said cycle mode, said minimum pause interval corresponding to a sufficient time in the off state to permit the apparatus to dissipate substantially all of the useful residual thermal energy remaining stored in said apparatus after an immediately preceding burn interval; and (f) in response to temperature conditions in said conditioned space, maintaining the measured temperature substantially at said set point temperature, said step of maintaining including:

in response to differences between said measured temperature and said set point temperature in a second sense (opposite said first sense), maintaining said on-time interval at said minimum on-time interval while decrementing said pause interval in successive cycles until the measured temperature returns substantially to said set point temperature, or until said pause interval becomes equal to said minimum pause interval, whichever occurs first; and in response to (1) the pause interval being equal to the minimum pause interval, (2) the on-time interval being equal to the minimum on-time interval, and (3) a difference between said measured temperature and said set point temperature in said second sense, incrementing said on-time interval to reduce said difference;

whereby the minimum on-time interval is the preferred on-time interval for said system and is maintained in spite of temperature modification requirements in said conditioned space unless the pause interval is equal to the minimum pause interval.

89. The method according to claim 88 wherein each cycle, consisting of a on-time and a pause interval, has a variable total time interval.

90. The method according to claim 88 wherein step (f) includes permitting modification of said on-time interval and said pause interval only as specified increments and decrements of the existing on-time and pause intervals, respectively.

91. The method according to claim 88 wherein said measured temperature signal varies in predetermined minimum temperature increments, and wherein step (f) includes maintaining said measured temperature within one minimum predetermined temperature increment of said set point temperature by modifying said on-time and pause intervals.

92. The method according to claim 91 further comprising the steps of:

(g) establishing a temperature increment transition time for said apparatus corresponding to the time required for said apparatus in said on state to change the temperature in said space by said minimum predetermined temperature increment; and (h) in response to entry into said cycle mode, establishing an initial value of said on-time interval which is significantly less than said temperature increment transition time.

93. The method according to claim 92 wherein said minimum on-time interval is determined by operating characteristics of said apparatus, and wherein step (h) includes establishing said minimum on-time interval as said initial value of said burn interval.

94. The method according to claim 93 wherein step (h) further includes establishing an initial pause interval as an inverse function of said temperature increment transition time.

95. The method according to claim 88 further comprising:

in said cycle mode, and in response to differences between said measured temperature and said set point temperature in said first sense, calculating a decremented on-time interval value as a function of the existing on-time interval;

comparing the decremented on-time interval value to the minimum on-time interval;

in response to the decremented on-time interval value being at least as long as the minimum pause interval, establishing the decremented on-time interval value as the on-time interval;

in response to the decremented on-time interval value being shorter than the minimum on-time interval, establishing the minimum on-time interval as the on-time interval; and in response to the decremented on-time interval value being shorter than the minimum on-time interval, calculating an incremented pause interval value as a function of the existing pause interval, and establishing said incremented pause interval value as the pause interval;

whereby the pause interval is only incremented in response to a corresponding attempt to decrement the on-time interval below the minimum on-time interval.

96. The method according to claim 95 further comprising:

counting the number of attemps made in each cycle to decrement the on-time interval below said minimum on-time interval; and in response to the attemps count being greater than a predetermined count value, terminating the cycle mode.

97. The method according to claim 88 further comprising:

counting the number of cycles occurring in each cycle mode;

in response to the occurrence of a predetermined number of successive cycles without change in said on-time and pause intervals, calculating a decremented on-time interval value as a function of the existing on-time interval;

in response to the decremented on-time interval value being at least as long as the minimum pause interval, establishing the decremented on-time interval value as the on-time interval;

in response to the decremented on-time interval value being shorter than the minimum on-time interval, establishing the minimum on-time interval as the on-time interval; and in response to the decremented on-time interval value being shorter than the minimum on-time interval, calculating an incremented pause interval value as a preset function of the existing pause interval, and establishing said incremented pause interval value as the pause interval;

whereby the pause interval in only incremented in response to a corresponding attempt to decrement the on-time interval below the minimum on-time interval.

98. The method according to claim 88 wherein said apparatus, in its on state, tends to change the measured temperature in said space in said first sense to oppose temperature conditions in said space that tend to cha.. ·e the measured temperature in a second sense opposite said first sense, wherein said measured temperature signal varies in predetermined minimum temperature increments, said method further comprising the steps of:

initiating a continuous on-time mode of operation in response to a predetermined difference, in said second sense, between said measured and set point temperatures, said continuous on-time mode being characterized by said apparatus being maintained continuously in said on state, wherein said predetermined difference is equal to a plurality of said minimum temperature increments;

in said continuous on-time mode, and in response to said measured temperature becoming equal to the set point temperature, initiating a cycle mode.

99. The method according to claim 88 further comprising:

in said cycle mode, and in response to the difference between the measured and set point temperatures becoming a pre-established value in said second sense, transferring the system out of said cycle mode;

wherein said pre-established value is greater than said predetermined minimum temperature increment and less than said predetermined difference between said measured and set point temperatures.

100. The method according to claim 88 further comprising:

in said cycle mode, and in response to the difference between the measured and set point temperatures beccoming a pre-established value in said second sense at the end of each of plural successive cycles, transferring the system out of said cycle mode;

wherein said pre-established value is greater than said predetermined minimum temperature increment and less than said predetermined difference between said measured and set point temperatures.

101. The method according to claim 88 wherein said apparatus is a forced air heating apparatus in which a fan blows air, during the on state, over a heat exchanger to heat the air, and then delivers the heated air into the conditioned space, said method further comprising:

during each pause interval, maintaining said fan on for the initial portion of that pause interval, said initial portion being a predetermined fraction of the on-time interval.

102. The method according to claim 88 further comprising the steps of:

periodically establishing a temperature increment transition time for said apparatus corresponding to the time required for said apparatus (in said on state) to change the temperature in said space by a minimum predetermined temperature increment;

periodically determining the accumulated on-time interval time, in the cycle mode, required to change the temperature in said space by said minimum predetermined increment; and periodically computing the cost savings resulting from operating in the cycle mode by comparing said temperature increment transition time to said accumulated on-time interval time.

103. The method according to claim 88 wherein said temperature modifying apparatus is of a type which must be in its on state for a minimum period of time before reaching substantially optimum efficiency in modifying the temperature in the conditioned space, wherein said minimum on-time interval is at least as long as said minimum period of time, and wherein step (f) includes preventing said on-time interval from becoming shorter than said minimum on-time interval.

104. The method according to claim 103 wherein step (f) includes preventing said pause interval from becoming shorter than said minimum pause interval.

105. The method according to claim 103 wherein said apparatus is a forced air heater in which heat is generated during the on state to heat a thermal exchange surface over which air is directed before being delivered into said conditioned space, wherein said minimum on-time interval corresponds to the apparatus on time required to heat the thermal exchange surface sufficiently so that further apparatus on time does not significantly increase the temperature of said thermal exchange surface, wherein said minimum pause interval is sufficiently long to enable most of the useful thermal energy stored in said thermal exchange surface during the immediately previous on-time interval to be transferred to the air directed over the thermal exchange surface but sufficiently short to prevent complete cooling of said thermal exchange surface to ambient temperature between on-time intervals, said method further comprising the step of maintaining air flow over said thermal exchange surface for at least a portion of each pause interval.

106. The method according to claim 105 wherein said portion of each pause interval is a predetermined fraction of the current on-time interval.

107. The method according to claim 103 wherein said apparatus is a boiler-type heater in which liquid is heated during the on state and caused to flow through pipes at least partially located in said conditioned space to heat air in that space, wherein said minimum on-time interval corresponds to the time required to heat said liquid to substantially its maximum temperature, and wherein said minimum pause interval is sufficiently long to enable most of the useful thermal energy stored in said liquid during the immediately preceding on-time interval to be transferred to the air in said conditioned space but sufficiently short to prevent said liquid to be cooled to the ambient temperature in said conditioned space between on-time intervals.

108. The method according to claim 103 wherein said apparatus is an air conditioner in which a refrigerant fluid is compressed to a liquid state during the apparatus on state to cool a thermal exchange surface, the refrigerant fluid tending to return to a gaseous state during the off state, wherein said minimum pause interval is sufficiently long to permit vaporization of the refrigerant fluid between on-time intervals, wherein said minimum on-time interval is sufficiently long to ensure that relatively cool refrigerant fluid in its vapor state can be compressed to its liquid state, said method further comprising establishing a maximum pause interval for said cycle mode, wherein step (f) includes preventing said pause interval from becoming longer than said maximum pause interval, and wherein said maximum pause interval is sufficiently short to prevent the vaporized refrigerant fluid from warming significantly beyond the temperature necessary to achieve vaporization.

109. A method according to claim 88 further comprising the steps of:

permitting manual entry of selected time information into said system;

continuously measuring elapsed time; and in response to the measured time becoming equal to a manually selected and entered time, establishing a changed condition in said system.

110. The method according to claim 109 wherein said changed condition is said set point temperature.

111. The method according to claim 88 further comprising the step of permitting manual entry of new set point temperature information in order to override the stored set point temperature.

112. The method according to claim 88 further comprising the steps of:
permitting manual entry of a plurality of selected temperature set points into said system along with time information identifying times when each temperature set point shall be effective;
measuring elapsed time on a continuous basis; and
in response to the measured time, automatically employing each of the entered set points as the operational set point in said system at the indicated effective time for that entered set point.

113. The method according to claim 88 further comprising the steps of:
permitting manual entry of data into a data storage unit;
wherein said apparatus includes a plurality of wires for electrically interconnecting said apparatus with a thermostat programmed to perform said method; and
providing a plurality of sequentially displayed prompts in common English language instructing a user to follow respective steps in connecting said a plurality of wires to said system, said prompts including instructions to the user to enter coded indicia as manually entered data to indicate system responses to wire connections made by the user in response to certain of said prompts.

114. An electronic thermostat system for controlling the operation of a temperature modifying apparatus arranged to modify the temperature, in a first sense, of a conditioned space, said apparatus having an on state in which the apparatus consumes fuel and an off state in which the apparatus does not consume fuel, said thermostat comprising:
set point means for storing a set point temperature representing the desired temperature in said conditioned space;
measurement means for measuring the temperature in said conditioned space and providing a measured temperature signal representing the measured temperatures;
cycle means for establishing a cycle mode of operation for said system in which said apparatus alternates between a variable on-time interval (in which said apparatus is in said on state) and a variable pause interval (in which said apparatus is in said off state);
means for establishing a minimum on-time interval for said cycle mode, said minimum on-time interval corresponding to the on state time of said apparatus required to achieve substantially optimum efficiency in terms of maximum temperature modification in said conditioned space for a specified fuel consumption;
means for establishing a minimum pause interval for said cycle mode, said minimum pause interval corresponding to sufficient time in said off state to permit said apparatus to dissipate substantially all of the useful residual thermal energy remaining stored in said apparatus after an immediately preceding on-time interval;
cycle modification means responsive to temperature conditions in said conditioned space for maintaining the measured temperature substantially at said set point, said cycle modification means including:
means responsive to differences between said measured temperature and said set point temperature in said first sense for maintaining said pause interval at said minimum pause interval while decrementing said on-time interval in successive cycles until the measured temperature returns substantially to said set point temperature, or until said on-time interval becomes equal to said minimum on-time interval, whichever occurs first; and
means responsive to (a) the on-time interval being equal to the minimum on-time interval, (b) the pause interval being equal to the minimum pause interval, and (c) a difference between said measured temperature and said set point temperature in said first sense, for incrementing said pause interval to reduce said difference;
whereby the minimum on-time interval is the preferred on-time interval for said system.

115. The system according to claim 114 wherein each cycle, consisting of a on-time interval and a pause interval, has a variable total time.

116. The system according to claim 114 wherein said cycle modification means includes means for permitting modification of said on-time interval and said pause interval only as specified increments and decrements of the existing on-time and pause intervals, respectively.

117. The system according to claim 114 wherein said measured temperature signal varies in predetermined minimum temperature increments, and wherein said cycle modification means includes means for maintaining said measured temperature within one minimum predetermined temperature increment of said set point temperature by modifying said on-time and pause intervals.

118. The system according to claim 117 further comprising:
means for establishing a temperature increment transition time for said apparatus corresponding to the time required for said apparatus, in said on state, to change the temperature in said space by said minimum predetermined temperature increment; and
initial interval determining means responsive to entry of said system into said cycle mode for establishing an initial value of said on-time interval which is significantly less than said temperature increment transition time.

119. The system according to claim 118 wherein said minimum on-time interval is determined by operating characteristics of said apparatus, and wherein said initial interval determining means includes means for establishing said minimum on-time interval as said initial value of said on-time interval.

120. The system according to claim 119 wherein said initial interval determining means further comprises means for establishing an initial pause interval value as an inverse function of said temperature increment transition time.

121. An electronic thermostat system for controlling the operation of a temperature-modifying apparatus arranged to modify the temperature of a conditioned space, said apparatus having an on state in which it consumes fuel and an off state in which it does not consume fuel, said thermostat comprising:

set point storage means for storing a set point temperature representing the desired temperature in said conditioned space;

measurement means for measuring the temperature in said conditioned space and providing a measured temperature signal representing the measured temperature;

cycle means for establishing a cycle mode of operation for said system in which said apparatus alternates between a variable on-time interval (in which said apparatus is in said on state) and a variable pause interval (in which said apparatus is in said off state), wherein the total time of the on-time and pause intervals is variable from cycle to cycle;

means for establishing a minimum on-time interval for said cycle mode;

cycle modification means responsive to said measured temperature for maintaining the temperature in said conditioned space substantially at the set point temperature by modifying the durations of the on-time and pause intervals;

means for establishing a temperature increment transition time for said apparatus corresponding to the time required for said apparatus (in said on state) to change the temperature in said space by a predetermined minimum temperature increment; and initial interval determining means responsive to entry of said system into said cycle mode for establishing an initial value of said on-time interval which is significantly less than said temperature increment transition time;

wherein said minimum on-time interval is determined by operation characteristics of said apparatus, and wherein said initial interval determining means includes means for establishing said minimum on-time interval as said initial value of said on-time interval; and wherein said initial interval determining means further includes means for establishing an initial pause interval as an inverse function of the temperature increment transition time.

122. The system according to claim 121 wherein said portion of each pause interval is a predetermined fraction of the current on-time interval.

123. The system according to claim 121 wherein said apparatus (in its on state) tends to change the measured temperature in said conditioned space in a first sense to oppose temperature conditions in said conditioned space which tend to change the measured temperature therein in a second sense opposite said first sense, said system further comprising:

means operative in said cycle mode, and responsive to a predetermined difference between said measured temperature and said set point temperature in said second sense, for calculating a decremented pause interval value as a function of the existing pause interval;

means for comparing the calculated decremented pause interval to the minimum pause interval;

pause interval establishing means, responsive to the decremented pause interval being at least as long as the minimum pause interval, for establishing the decremented pause interval value as the pause interval, said pause interval establishing means being further responsive to the decremented pause interval being shorter than the minimum pause interval for establishing the minimum pause interval as the pause interval; and on-time interval incrementing means, responsive to the decremented pause interval value being shorter than the minimum pause interval, for calculating an incremented on-time interval value as a function of the existing on-time interval, and for establishing said incremented on-time interval value as the on-time interval;

whereby the on-time interval is only incremented in response to an attempt to decrement the pause interval below the minimum pause interval.

124. The system according to claim 121 wherein said apparatus (in its on state) tends to change the measured temperature in said conditioned space in a first sense to oppose temperature conditions in said conditioned space which tend to change the measured temperature therein in a second sense opposite said first sense, said system further comprising:

means operative in said cycle mode, and responsive to at least a predetermined difference between said measured temperature and said set point temperature in said first sense, for calculating a decremented on-time interval value as a function of the existing on-time interval;

means for comparing the decremented on-time interval to the minimum on-time interval;

on-time interval establishing means, responsive to the decremented on-time interval being as least as long as the minimum on-time interval, for establishing the decremented on-time interval value as the on-time interval, and responsive to the decremented on-time interval value being shorter than the minimum on-time interval for establishing the minimum on-time interval as the on-time interval; and pause interval incrementing means, responsive to the decremented on-time interval value being shorter than the minimum on-time interval, for calculating an incremented pause interval value as a function of the existing pause interval, and for establishing said incremented pause interval as the pause interval;

whereby the pause interval is only incremented in response to a corresponding attempt to decrement the on-time interval below the minimum on-time interval.

125. The sytem according to claim 124 further comprising:

means operative in said cycle mode for counting the number of attempts made in each cycle mode to decrement the on-time interval below said minimum on-time interval; and means responsive to the total of said attemps count being greater than a predetermined count value for terminating the cycle mode.

126. The system according to claim 121 further comprising:

means for counting the number of cycles occurring in each cycle mode;

means responsive to the occurrence of a predetermined number of successive cycles without change in said on-time and pause intervals for calculating a decremented on-time interval value as a function of the existing on-time interval;

on-time interval establishing means, responsive to the decremented on-time interval value being at least as long as the minimum on-time interval, for establishing the decremented on-time interval value as the on-time interval, and responsive to the decremented on-time interval value being shorter than the minimum on-time interval, for establishing the minimum on-time interval as the on-time interval; and pause interval incrementing means, responsive to the decremented on-time interval value being shorter than the minimum on-time interval, for calculating an incremented pause interval value as a function of the existing pause interval, and for establishing said incremented pause interval as the pause interval;

whereby the pause interval is only incremented in response to a corresponding attempt to decrement the on-time interval below the minimum on-time interval.

* * * * *

UNITED STATES PATENT AND TRADEMARK OFFICE
CERTIFICATE OF CORRECTION

PATENT NO. : 4,725,001

DATED : February 16, 1988

INVENTOR(S) : Daniel C. Carney et al

Page 1 of 3

It is certified that error appears in the above-identified patent and that said Letters Patent is hereby corrected as shown below:

In The Abstract:

Fourth line from bottom, insert --on-time-- before "intervals"; third line from bottom, insert --on-time-- before "mode"; second line from bottom, after "continuous" insert --on-time--.

Column 2, line 23, "it" should read --It--; column 4, line 15, delete "are"; column 7, line 8, "maybe" should read --may be--; column 8, line 6, "maybe" should read --may be--; column 10, line 39, "24 V (A/C)" should read --24 VAC (A/C)--; column 13, line 1, "the only" should read --only the--; column 15, line 24, after "twenty-four" insert --hour--; column 16, line 52, "colorstart" should read --coldstart--; column 16, line 60, "poiint" should read --point--; column 20, line 38, "minimim paused" should read --minimum pause--; column 21, line 22, the comma after "Number" should be a semicolon; column 22, line 48, "pause on-time" should read --pause/on-time--; column 23, line 6, "transistion" should read --transition--; column 23, line 46, "examplary" should read --exemplary--; column 23, line 53, "dose" should read --does--; column 24, line 30, after "mode" insert --on-time--; column 24, line 40, "on-time pause" should read --on-time/pause--; column 24, line 41, "coat" should read --cost--; column 24, line 45, "Coat" should read --Cost--; column 27, line 5, delete "burn"; column 30, line 66, "state" should read --stated--; column 31, line 20, insert quotation marks about "on-time"; column 32, line 24, "in" (second occurrence) should read --is--; column 33, line 64, "burn" should read --on-time--; column 37, lines 36 and 39, "burn" should read --on-time--; column 39, line 39, "burn" should read --on-time--; column 39, line 45, insert --interval-- after "on-time"; column 42, line 9, "burn" should read --on-time--; column 44, line 18, "burn" should read --on-time--;

UNITED STATES PATENT AND TRADEMARK OFFICE
CERTIFICATE OF CORRECTION

PATENT NO.  :  4,725,001

DATED  :  February 16, 1988

INVENTOR(S)  :  Daniel C. Carney et al

It is certified that error appears in the above-identified patent and that said Letters Patent is hereby corrected as shown below:

column 46, line 53 "burn" should read --on-time--; column 47, line 29, "on-time" should read --pause--; column 47, line 31, delete "burn"; column 47, lines 32, 33 and 34, "burn" should read --on-time--; column 51, line 9, "burn" should read --on-time--; column 51, line 66, "burn" should read --on-time--; column 52, lines 32 and 35, "attemps" should read --attempts--; column 53, line 31, "becomming" should read --becoming--; column 54, line 3, after "103" insert --further comprising establishing a minimum pause interval for said cycle mode--; column 58, line 51, change "attemps" to --attempts--.

In The Drawings:

Fig. 1, "M35" should read --LM335--; Fig. 11, the left side of the drawing was not printed, whereby "RCED AIR" should read --FORCED AIR--; "ILER" should read --BOILER--; "CREMENT" should read --INCREMENT--; "TERVAL" should read --INTERVAL--; "N INTERVAL" should read --FAN INTERVAL--; the left hand side of the two diamonds labelled "HEAT FORCED AIR ONLY & ON TIME FLAG = 0?" and "TIME > CYCLE INTERVAL START + FAN INT'V'L?" should each have a horizontal line extending therefrom labelled --NO-- and both lines should be joined by a vertical line leading to the line having a horizontal arrow below the "FAN OFF" box;

UNITED STATES PATENT AND TRADEMARK OFFICE
CERTIFICATE OF CORRECTION

PATENT NO. : 4,725,001

DATED : February 16, 1988

INVENTOR(S) : Daniel C. Carney et al

It is certified that error appears in the above-identified patent and that said Letters Patent is hereby corrected as shown below:

Fig. 15, the unconnected left end of the horizontal line below the "ATTEMPT COUNT ≯ 3" diamond should be connected to the unconnected left end of the horizontal "NO" line having no arrow, and the unconnected left end of the horizontal "NO" line having a left-pointing arrow should be connected to the unconnected left end of the unlabelled horizontal line having a right-pointing arrow.

Signed and Sealed this

Eighth Day of November, 1988

Attest:

DONALD J. QUIGG

*Attesting Officer*     *Commissioner of Patents and Trademarks*